US012724985B2

(12) United States Patent
Sabapathy et al.

(10) Patent No.: US 12,724,985 B2
(45) Date of Patent: Sep. 1, 2026

(54) MACHINE-LEARNING BASED IRRELEVANT SENTENCE CLASSIFIER

(71) Applicant: UnitedHealth Group Incorporated, Minnetonka, MN (US)

(72) Inventors: Rajesh Sabapathy, Haryana (IN); Chirag Mittal, Haryana (IN); Gourav Awasthi, Haryana (IN); Aditya Teja Josyula, Collierville, TN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 219 days.

(21) Appl. No.: 17/937,606

(22) Filed: Oct. 3, 2022

(65) Prior Publication Data

US 2023/0419042 A1 Dec. 28, 2023

Related U.S. Application Data

(60) Provisional application No. 63/366,797, filed on Jun. 22, 2022.

(51) Int. Cl.
*G06F 40/56* (2020.01)
*G06F 16/34* (2019.01)
(Continued)

(52) U.S. Cl.
CPC ............ *G06F 40/56* (2020.01); *G06F 16/345* (2019.01); *G06F 40/247* (2020.01); *G06F 40/30* (2020.01);
(Continued)

(58) Field of Classification Search
CPC ........ G06F 40/56; G06F 40/247; G06F 40/30; G06F 40/35; G06F 16/345; G06F 40/289; G06N 5/022
See application file for complete search history.

(56) References Cited

U.S. PATENT DOCUMENTS 6,996,414 B2 2/2006 Vishwanathan et al.
7,318,031 B2 1/2008 Bantz et al.
(Continued)

FOREIGN PATENT DOCUMENTS

EP 3839850 A1 6/2021
KR 10-2022-0154592 A 11/2022

OTHER PUBLICATIONS

Patel, Darshna, Saurabh Shah, and Hitesh Chhinkaniwala. "Fuzzy logic based multi document summarization with improved sentence scoring and redundancy removal technique." Expert Systems with Applications 134 (2019): 167-177. (Year: 2019).*
(Continued)

*Primary Examiner* — Andrew C Flanders
*Assistant Examiner* — Theodore Withey
(74) *Attorney, Agent, or Firm* — Alston & Bird LLP

(57) ABSTRACT

There is a need for more effective, efficient, and accurate computer text comprehension. This need is addressed by applying unique text processing techniques to identify and remove irrelevant sentences from a narrative. The text processing techniques include a machine-learning based model that is trained using automatically generated training data that is tailored to a particular circumstance. A method for machine narrative comprehension includes receiving a narrative data object comprising one or more sentences; determining, using a machine-learning based irrelevant classifier model, a relevance of at least one of the one or more sentences; responsive to a determination that at least one sentence is irrelevant, generating a pertinent summary by removing the at least one sentence from the narrative; and generating, based at least in part on the pertinent summary, an output indicia data object for the narrative data object.

13 Claims, 11 Drawing Sheets

(51) Int. Cl.
*G06F 40/247* (2020.01)
*G06F 40/289* (2020.01)
*G06F 40/30* (2020.01)
*G06F 40/35* (2020.01)
*G06N 5/022* (2023.01)

(52) U.S. Cl.
CPC ............. *G06F 40/35* (2020.01); *G06N 5/022* (2013.01); *G06F 40/289* (2020.01)

(56) References Cited

U.S. PATENT DOCUMENTS 7,702,508 B2 4/2010 Bennett
7,849,147 B2 12/2010 Rohall et al.
7,865,560 B2 1/2011 Rohall et al.
7,886,012 B2 2/2011 Bedi et al.
8,750,489 B2 6/2014 Park
8,825,478 B2 9/2014 Cox et al.
8,914,452 B2 12/2014 Boston et al.
8,983,840 B2 3/2015 Deshmukh et al.
9,116,984 B2 8/2015 Caldwell et al.
9,118,759 B2 8/2015 Krishnapuram et al.
9,300,790 B2 3/2016 Gainsboro et al.
9,348,817 B2 5/2016 Bohra et al.
9,413,877 B2 8/2016 Aldrich et al.
9,565,301 B2 2/2017 Lee et al.
10,009,464 B2 6/2018 Slovacek
10,051,122 B2 8/2018 Raanani et al.
10,204,158 B2 2/2019 Hay et al.
10,353,904 B2 7/2019 Enders et al.
10,354,677 B2 7/2019 Mohamed et al.
10,628,474 B2 4/2020 Modani et al.
10,637,898 B2 4/2020 Cohen et al.
10,659,585 B1 5/2020 Graham et al.
10,785,185 B2 9/2020 Vennam et al.
10,817,787 B1* 10/2020 Zhang .................. G06F 40/295
11,018,885 B2 5/2021 Niekrasz
11,070,673 B1 7/2021 Lemus et al.
11,074,284 B2 7/2021 Cunico et al.
11,115,353 B1 9/2021 Crowley et al.
11,228,681 B1 1/2022 Rosenberg
11,232,266 B1 1/2022 Biswas et al.
11,262,978 B1 3/2022 Cohen et al.
11,272,058 B2 3/2022 Khafizov et al.
11,315,569 B1 4/2022 Talieh et al.
11,487,797 B2 11/2022 Shukla et al.
11,500,951 B1 11/2022 Shetty
2009/0259642 A1 10/2009 Cao et al.
2010/0076978 A1 3/2010 Cong et al.
2010/0088299 A1 4/2010 O'Sullivan et al.
2010/0287162 A1 11/2010 Shirwadkar
2012/0209590 A1 8/2012 Huerta et al.
2013/0151533 A1 6/2013 Udupa et al.
2014/0032207 A1* 1/2014 Jin ....................... G06F 40/279 704/9
2014/0200928 A1 7/2014 Watanabe et al.
2015/0154956 A1 6/2015 Brown
2015/0193429 A1 7/2015 Bohra et al.
2016/0196492 A1* 7/2016 Johnson ................ G06N 20/00 706/12
2016/0277577 A1 9/2016 Yentis et al.
2016/0350283 A1 12/2016 Carus et al.
2017/0054837 A1 2/2017 Choi et al.
2017/0286867 A1* 10/2017 Bell ...................... G06N 20/00
2018/0189267 A1* 7/2018 Takiel .................... G10L 15/19
2018/0351887 A1 12/2018 Efrati et al.
2019/0042645 A1 2/2019 Othmer et al.
2019/0122142 A1 4/2019 Brunn et al.
2019/0297186 A1 9/2019 Karani
2019/0340296 A1 11/2019 Cunico et al.
2019/0373111 A1 12/2019 Rute et al.
2019/0386937 A1 12/2019 Kim
2020/0074312 A1 3/2020 Liang et al.
2020/0137224 A1 4/2020 Rakshit et al.
2020/0184155 A1 6/2020 Galitsky
2020/0193095 A1 6/2020 Fan et al.
2020/0210521 A1* 7/2020 Hutchins ............... G06F 40/221
2020/0218722 A1* 7/2020 Mai ....................... G06N 3/044
2020/0227026 A1 7/2020 Rajagopal et al.
2020/0311738 A1 10/2020 Gupta et al.
2020/0311739 A1 10/2020 Chopra et al.
2020/0334419 A1 10/2020 Raanani et al.
2020/0401765 A1 12/2020 Ran et al.
2021/0034707 A1 2/2021 Podgorny et al.
2021/0117815 A1* 4/2021 Creed ..................... G06N 3/04
2021/0133251 A1 5/2021 Tiwari et al.
2021/0182326 A1 6/2021 Romano et al.
2021/0182491 A1 6/2021 Chen et al.
2021/0193135 A1 6/2021 Gavai et al.
2021/0248323 A1* 8/2021 Maheshwari ........ G06V 30/416
2021/0248324 A1* 8/2021 Choudhary ........... G06F 40/216
2021/0264897 A1 8/2021 Churav et al.
2021/0272040 A1 9/2021 Johnson et al.
2021/0303784 A1 9/2021 Brdiczka et al.
2021/0304747 A1 9/2021 Haas et al.
2021/0334469 A1* 10/2021 Feng ..................... G06N 20/00
2021/0342554 A1 11/2021 Martin et al.
2021/0357588 A1* 11/2021 Friedrich ............... G06N 20/00
2021/0365773 A1* 11/2021 Subramanian ........ G06F 40/166
2021/0375289 A1 12/2021 Zhu et al.
2021/0390127 A1 12/2021 Fox et al.
2022/0004971 A1 1/2022 Kitamura
2022/0030110 A1 1/2022 Khafizov et al.
2022/0067269 A1 3/2022 de Oliveira et al.
2022/0068279 A1 3/2022 Embar et al.
2022/0108086 A1 4/2022 Wu et al.
2022/0109585 A1 4/2022 Asthana et al.
2022/0138432 A1 5/2022 Galitsky
2022/0156464 A1* 5/2022 Norton .................. G06F 16/345
2022/0189484 A1 6/2022 Malladi et al.
2022/0215052 A1 7/2022 Chalana et al.
2022/0277135 A1 9/2022 Kryscinski et al.
2022/0337443 A1 10/2022 Sood et al.
2022/0391595 A1 12/2022 Shevelev et al.
2022/0392434 A1 12/2022 Asi et al.
2022/0414338 A1 12/2022 Cho et al.
2023/0054726 A1 2/2023 Roy et al.
2023/0057760 A1* 2/2023 Galitsky ............. G06F 16/3329
2023/0122429 A1 4/2023 Gunasekara et al.
2023/0297778 A1* 9/2023 Can ...................... G06F 16/345
2023/0315993 A1 10/2023 Nieborowski et al.
2023/0334072 A1 10/2023 Matsuzawa et al.
2023/0359657 A1 11/2023 Ganhotra et al.
2023/0385557 A1 11/2023 Sabapathy et al.
2023/0419051 A1 12/2023 Sabapathy et al.
2025/0061277 A1 2/2025 Zhu et al.

OTHER PUBLICATIONS

Advisory Action (PTOL-303) Mailed on Jun. 27, 2024 for U.S. Appl. No. 17/405,555, 2 page(s).

Final Rejection Mailed on Apr. 15, 2024 for U.S. Appl. No. 17/405,555, 25 page(s).

Notice of Allowance and Fee(s) Due for U.S. Appl. No. 17/122,607, dated Mar. 28, 2023, (8 pages), United States Patent and Trademark Office, US.

Yih, Wen-tau et al. "Multi-Document Summarization By Maximizing Informative Content-Words," In IJCAI, Jan. 6, 2007, vol. 7, pp. 1776-1782. [Available online: https://www.aaai.org/Papers/IJCAI/2007/IJCAI07-287.pdf].

Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

Zhong, Junmei et al. "Predicting Customer Call Intent By Analyzing Phone Call Transcripts Based On CNN For Multi-Class Classifi-

(56) References Cited

OTHER PUBLICATIONS cation," Computer Science & Information Technology (CS & IT), pp. 9-20, arXiv preprint arXiv: 1907.03715, Jul. 8, 2019, (12 pages), available online: https://arxiv.org/ftp/arxiv/papers/1907/1907.03715.pdf.
Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.
Zweig, Geoffrey et al. "Automated Quality Monitoring For Call Centers Using Speech and NLP Technologies," Proceedings of the Human Language Technology Conference of the NAACL, Companion Volume, pp. 292-295, Jun. 2006.
"Summarize Text With The Extractive Summarization API," Azure Cognitive Services|Microsoft Docs, Mar. 16, 2022, (6 pages) [Retrieved from the Internet May 4, 2022] <URL: https://docs.microsoft.com/en-us/azure/cognitive-services/language-service/text-summarization/how-to/call-api>.
"Supercharge Your Call Notes—Automated Call Recording and Transcription," Jog.Ai, (6 pages), (online), [Retrieved from the Internet Nov. 15, 2021] <URL: https://jog.ai/>.
"Trustworthy and Cutting Edge AI," The Blue, (12 pages), (online), [Retrieved from the Internet Nov. 12, 2021] <URL: https://theblue.ai/en/>.
Banerjee, Siddhartha et al. "Multi-Document Abstractive Summarization Using ILP Based Multi-Sentence Compression," In Proceedings of the Twenty-Fourth International Joint Conference On Artificial Intelligence (IJCAI 2015), Jan. 2015, pp. 1208-1214.
Baumel, Tal et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).
Baumel, Tal et al. "Topic Concentration in Query-Focused Summarization," Proceedings of the Thirtieth AAAI Conference On Artificial Intelligence (AAAI-16), pp. 2573-2579, Mar. 5, 2016.
Biswas, Pratik K. et al. "Extractive Summarization of Call Transcripts," arXiv Preprint arXiv:2103.10599, Mar. 19, 2021, (10 pages).
Brin, Sergey. "The PageRank Citation Ranking: Bringing Order To The Web," Proceedings of ASIS, vol. 98, Jan. 29, 1998, (17 pages).
Canhasi, Ercan. "Ercan Canhasi: Query Focused Multi Document Summarization Based on the Multi Facility Location Problem," Computer Science On-Line Conference, Artificial Intelligence Trends In Intelligent Systems, CSOC 2017, Advances In Intelligent Systems and Computing, vol. 573, Springer, Cham., Apr. 7, 2017, pp. 210-219, DOI: 10.1007/978-3-319-57261-1_21.
Carbonell, Jaime et al. "The Use Of MMR, Diversity-Based Reranking For Reordering Documents and Producing Summaries," In Proceedings of the 21st Annual International ACM SIGIR Conference on Research and Development In Information Retrieval, Aug. 1998, pp. 335-336. DOI: 10.1145/290941.291025.
Chandramouli, Aravind et al. "Unsupervised Paradigm For Information Extraction From Transcripts Using BERT," arXiv Preprint arXiv:2110.00949, Oct. 3, 2021, (11 pages).
Chen, Yun-Nung et al. "Intra-Speaker Topic Modeling For Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.
Dang, Hoa Trang. "Overview of DUC 2005," In Proceedings of the Document Understanding Conference, Oct. 9, 2005, vol. 2005, (12 pages). [Available online: https://www-nlpir.nist.gov/projects/duc/pubs/2005papers/OVERVIEW05.pdf].
Devlin, Jacob et al. "BERT: Pre-Training of Deep Bidirectional Transformers for Language Understanding," Proceedings of NAACL-HLT 2019, Jun. 2, 2019, pp. 4171-4186.
Feigenblat, Guy et al. "Unsupervised Query-Focused Multi-Document Summarization Using The Cross Entropy Method," SIGIR '17: Proceedings of the 40th International ACM SIGIR Conference On Research and Development In Information Retrieval, Aug. 7, 2017, pp. 961-964, DOI: 10.1145/3077136.3080690.
Filatova, Elena et al. "Event-Based Extractive Summarization," In Proceedings of ACL Workshop on Summarization, vol. 111, (2004), (8 pages).
Garg, Nikhil et al. "ClusterRank: A Graph Based Method For Meeting Summarization," IDIAP Research Institute, Jun. 2009, (5 pages), Martigny, Switzerland.
Garg, Nikhil et al. "Clusterrank: A Graph Based Method For Meeting Summarization," Proceedings of the 10th International Conference of the International Speech Communication Association (Interspeech 2009), pp. 1499-1502, Sep. 6, 2009, Brighton, United Kingdom.
Gillick, Dan et al. "A Scalable Global Model For Summarization," In Proceedings of the NAACL HLT Workshop On Integer Linear Programming For Natural Language Processing, Jun. 2009, pp. 10-18.
Goldstein, Jade et al. "Summarization: (1) Using MMR for Diversity-Based Reranking and (2) Evaluating Summaries," Carnegie-Mellon University, Language Technologies Institute, Tipster III Summarization Project, Oct. 1, 1998, pp. 181-195.
Gupta, Surabhi et al. "Measuring Importance and Query Relevance In Topic-Focused Multi-Document Summarization," 45th Annual Meeting of the Association for Computational Linguistics Demo and Poster Sessions, Jun. 2007, pp. 193-196.
Hearst, Marti A. "Text-Tiling: A Quantitative Approach To Discourse Segmentation," Association for Computational Linguistics 1993 (1993), pp. 1-10.
Higashinaka, Ryuichiro et al. "Improving HMM-Based Extractive Summarization For Multi-Domain Contact Center Dialogues," In 2010 IEEE Spoken Language Technology Workshop, Dec. 12, 2010, pp. 61-66. DOI: 10.1109/SLT.2010.5700823.
Kothadiya, Aditya. "Why We Built A Note Taking Software—A Tool That Automatically Takes Notes And Analyzes Sales and Customer Calls," Avoma Blog, (article, online), [Retrieved from the Internet Nov. 15, 2021] <https://www.avoma.com/blog/ai-note-taking-software>.
Li, Chen et al. "Using Supervised Bigram-Based ILP for Extractive Summarization," In Proceedings of the 51st Annual Meeting of the Association For Computational Linguistics, Aug. 4, 2013, pp. 1004-1013, Sofia, Bulgaria.
Liang, Xinnian et al. "Unsupervised Keyphrase Extraction By Jointly Modeling Local and Global Context," arXiv Preprint arXiv:2109.07293v1 [cs.CL], Sep. 15, 2021, (10 pages).
Liu, Yang et al. "Text Summarization With Pretrained Encoders," arXiv Preprint arXiv:1908.08345v2 [cs.CL], Sep. 5, 2019, (11 pages).
McDonald, Ryan. "A Study Of Global Inference Algorithms In Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].
Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].
Mihalcea, Rada et al. "Textrank: Bringing Order Into Texts," In Proceedings of the 2004 Conference On Empirical Methods In Natural Language Processing, Jul. 2004, pp. 404-411. [Available online: https://www.aclweb.org/anthology/W04-3252.pdf].
Murray, Gabriel et al. "Generating and Validating Abstracts Of Meeting Conversations: A User Study," In Proceedings of the 6th International Natural Language Generation Conference (2010), (9 pages). [Available online: https://www.aclweb.org/anthology/W10-4211.pdf].
Narayan, Shashi et al. "Stepwise Extractive Summarization and Planning With Structured Transformers," arXiv Preprint arXiv:2010.02744v1 [cs.CL], Oct. 6, 2020, (17 pages).
Nenkova, Ani et al. "The Impact Of Frequency On Summarization," Technical Report MSRTR-2005-101, Microsoft Research, Jan. 2005,

(56) References Cited

OTHER PUBLICATIONS (9 pages), Redmond, Washington. [Available online: http://citeseerx.ist.psu.edu/viewdoc/download?doi=10.1.1.529.6099&rep=rep1&type=pdf].
Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].
Padmakumar, Vishakh et al. "Unsupervised Extractive Summarization Using Pointwise Mutual Information," arXiv Preprint arXiv:2102.06272v2 [cs.CL], Mar. 22, 2021, (8 pages).
Radev, Dragomir R. et al. "Ranking Suspected Answers To Natural Language Questions Using Predictive Annotation," ANLC '00: Proceedings of the Sixth Conference On Applied Natural Language Processing, Apr. 29, 2000, pp. 150-157, https://doi.org/10.3115/974147.974168.
Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.
Rudra, Koustav et al. "Summarizing Situational Tweets in Crisis Scenarios: An Extractive-Abstractive Approach," IEEE Transactions On Computational Social Systems, Sep. 16, 2019, vol. 6, No. 5, pp. 981-993.
Rudra, Koustav. "Extracting and Summarizing Information From Microblogs During Disasters," Ph.D. Thesis, Apr. 2018, (199 pages).
Shang, Guokan et al. "Unsupervised Abstractive Meeting Summarization with Multi-Sentence Compression and Budgeted Submodular Maximization," In Proceedings of the 56th Annual Meeting Of The Association For Computational Linguistics (Long Papers), Jul. 15, 2018, pp. 664-674, Melbourne, Australia. [Available online: https://www.aclweb.org/anthology/P18-1062.pdf].
Singer, Eleanor et al. "Some Methodological Uses of Responses To Open Questions and Other Verbatim Comments In Quantitative Surveys," Methods, Data, Analyses: A Journal For Quantitative Methods and Survey Methodology (mda), vol. 11, No. 2, (2017), pp. 115-134, DOI: 10.12758/mda.2017.01.
Steinberger, Josef et al. "Evaluation Measures for Text Summarization," Computing and Informatics, vol. 28, Mar. 2, 2009, pp. 1001-1026.
Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.
Sun, Xu et al. "Feature-Frequency-Adaptive On-Line Training For Fast and Accurate Natural Language Processing," Computational Linguistic, vol. 40, No. 3, Sep. 1, 2014, pp. 563-586.
Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.
Ushio, Asahi et al. "Back To The Basics: A Quantitative Analysis of Statistical and Graph-Based Term Weighting Schemes For Keyword Extraction," arXiv Preprint arXiv:210408028v2 [cs.LG], Sep. 13, 2021, (15 pages), United Kingdom.
Vanetik, Natalia et al. "Query-Based Summarization Using MDL Principle," Proceedings of the MultiLing 2017 Workshop On Summarization and Summary Evaluation Across Source Types and Genres, Association for Computational Linguistics, pp. 22-31, Apr. 3, 2017, Valencia, Spain.
Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.
Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.
Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.
NonFinal Office Action for U.S. Appl. No. 17/405,555, dated Nov. 17, 2023, (23 pages), United States Patent and Trademark Office, US.
Ma, Bing et al. "Extractive Dialogue Summarization Without Annotation Based On Distantly Supervised Machine Reading Comprehension In Customer Service," In IEEE/ACM Transactions on Audio, Speech, and Language Processing, vol. 30, pp. 87-97 Jan. 1, 2022, (Year: 2022).
Notice of Allowance and Fee(s) Due, for U.S. Appl. No. 17/815,817, dated Mar. 30, 2023, (12 pages), United States Patent and Trademark Office, US.
NonFinal Office Action for U.S. Appl. No. 17/122,607, dated Nov. 8, 2022, (58 pages), United States Patent and Trademark Office, US.
Vanetik, Natalia et al. "An Unsupervised Constrained Optimization Approach To Compressive Summarization," Information Sciences, vol. 509, Jan. 2020, pp. 22-35.
Non-Final Rejection Mailed on Aug. 14, 2024 for U.S. Appl. No. 17/405,555, 29 page(s).
Non-Final Rejection Mailed on Oct. 28, 2024 for U.S. Appl. No. 17/938,089, 6 page(s).
Notice of Allowance and Fees Due (PTOL-85) Mailed on Sep. 11, 2024 for U.S. Appl. No. 17/937,616, 14 page(s).
Final Rejection Mailed on Jan. 21, 2025 for U.S. Appl. No. 17/405,555, 30 page(s).
Notice of Allowance and Fees Due (PTOL-85) Mailed on Dec. 30, 2024 for U.S. Appl. No. 17/937,616, 2 page(s).
Advisory Action (PTOL-303) Mailed on Mar. 19, 2025 for U.S. Appl. No. 17/405,555, 2 page(s).
Notice of Allowance and Fees Due (PTOL-85) Mailed on Apr. 28, 2025 for U.S. Appl. No. 17/405,555, 16 page(s).
Notice of Allowance and Fees Due (PTOL-85) Mailed on Mar. 12, 2025 for U.S. Appl. No. 17/938,089, 10 page(s).

* cited by examiner

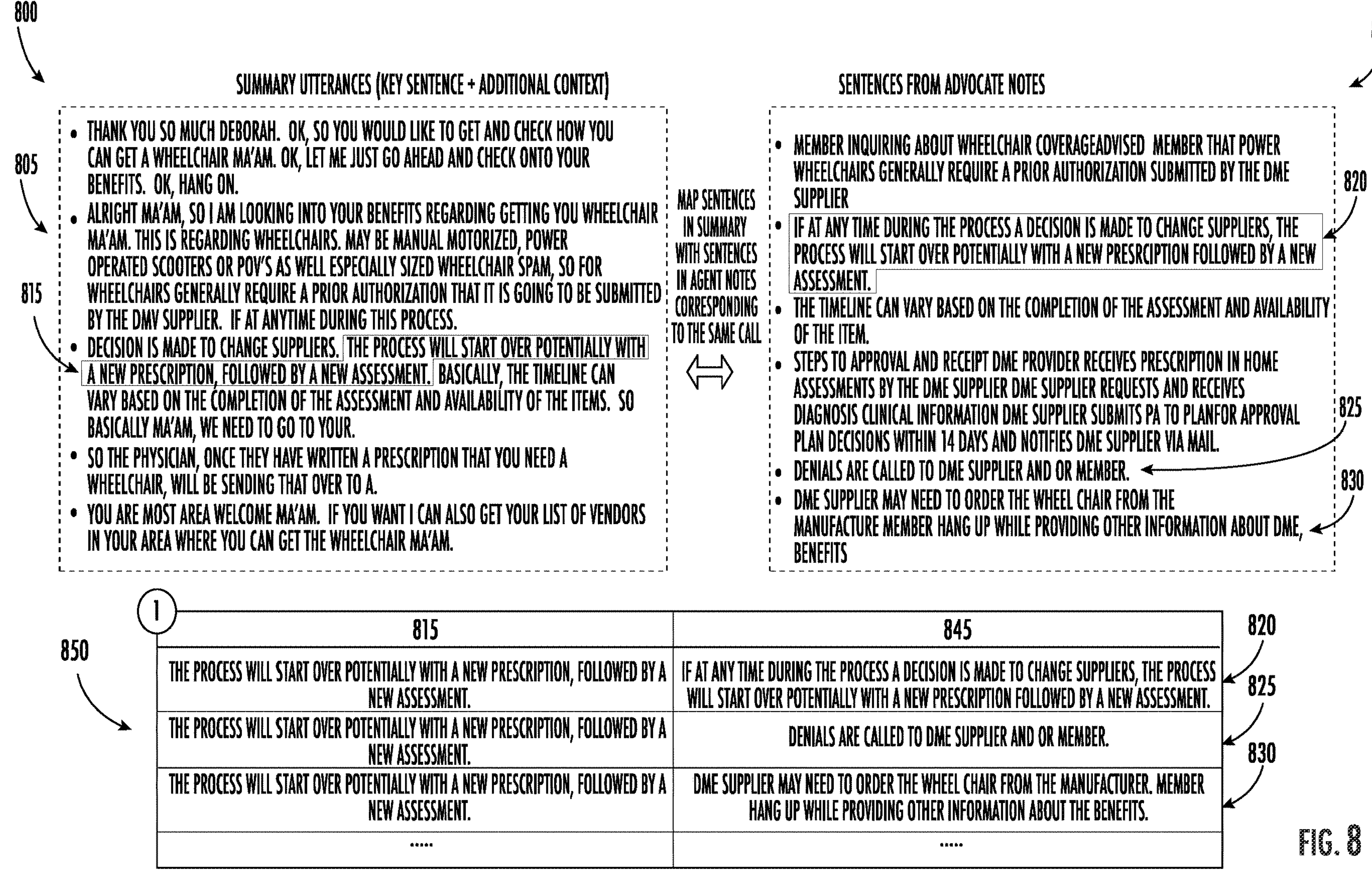
800
805
815
SUMMARY UTTERANCES (KEY SENTENCE + ADDITIONAL CONTEXT)
• THANK YOU SO MUCH DEBORAH. OK, SO YOU WOULD LIKE TO GET AND CHECK HOW YOU CAN GET A WHEELCHAIR MA'AM. OK, LET ME JUST GO AHEAD AND CHECK ONTO YOUR BENEFITS. OK, HANG ON.
• ALRIGHT MA'AM, SO I AM LOOKING INTO YOUR BENEFITS REGARDING GETTING YOU WHEELCHAIR MA'AM. THIS IS REGARDING WHEELCHAIRS. MAY BE MANUAL MOTORIZED, POWER OPERATED SCOOTERS OR POV'S AS WELL ESPECIALLY SIZED WHEELCHAIR SPAM, SO FOR WHEELCHAIRS GENERALLY REQUIRE A PRIOR AUTHORIZATION THAT IT IS GOING TO BE SUBMITTED BY THE DMV SUPPLIER. IF AT ANYTIME DURING THIS PROCESS.
• DECISION IS MADE TO CHANGE SUPPLIERS. THE PROCESS WILL START OVER POTENTIALLY WITH A NEW PRESCRIPTION, FOLLOWED BY A NEW ASSESSMENT. BASICALLY, THE TIMELINE CAN VARY BASED ON THE COMPLETION OF THE ASSESSMENT AND AVAILABILITY OF THE ITEMS. SO BASICALLY MA'AM, WE NEED TO GO TO YOUR.
• SO THE PHYSICIAN, ONCE THEY HAVE WRITTEN A PRESCRIPTION THAT YOU NEED A WHEELCHAIR, WILL BE SENDING THAT OVER TO A.
• YOU ARE MOST AREA WELCOME MA'AM. IF YOU WANT I CAN ALSO GET YOUR LIST OF VENDORS IN YOUR AREA WHERE YOU CAN GET THE WHEELCHAIR MA'AM.
MAP SENTENCES IN SUMMARY WITH SENTENCES IN AGENT NOTES CORRESPONDING TO THE SAME CALL
810
820
825
830
SENTENCES FROM ADVOCATE NOTES
• MEMBER INQUIRING ABOUT WHEELCHAIR COVERAGEADVISED MEMBER THAT POWER WHEELCHAIRS GENERALLY REQUIRE A PRIOR AUTHORIZATION SUBMITTED BY THE DME SUPPLIER
• IF AT ANY TIME DURING THE PROCESS A DECISION IS MADE TO CHANGE SUPPLIERS, THE PROCESS WILL START OVER POTENTIALLY WITH A NEW PRESRCIPTION FOLLOWED BY A NEW ASSESSMENT.
• THE TIMELINE CAN VARY BASED ON THE COMPLETION OF THE ASSESSMENT AND AVAILABILITY OF THE ITEM.
• STEPS TO APPROVAL AND RECEIPT DME PROVIDER RECEIVES PRESCRIPTION IN HOME ASSESSMENTS BY THE DME SUPPLIER DME SUPPLIER REQUESTS AND RECEIVES DIAGNOSIS CLINICAL INFORMATION DME SUPPLIER SUBMITS PA TO PLANFOR APPROVAL PLAN DECISIONS WITHIN 14 DAYS AND NOTIFIES DME SUPPLIER VIA MAIL.
• DENIALS ARE CALLED TO DME SUPPLIER AND OR MEMBER.
• DME SUPPLIER MAY NEED TO ORDER THE WHEEL CHAIR FROM THE MANUFACTURE MEMBER HANG UP WHILE PROVIDING OTHER INFORMATION ABOUT DME, BENEFITS
850
1
815
845
THE PROCESS WILL START OVER POTENTIALLY WITH A NEW PRESCRIPTION, FOLLOWED BY A NEW ASSESSMENT.
IF AT ANY TIME DURING THE PROCESS A DECISION IS MADE TO CHANGE SUPPLIERS, THE PROCESS WILL START OVER POTENTIALLY WITH A NEW PRESCRIPTION FOLLOWED BY A NEW ASSESSMENT.
THE PROCESS WILL START OVER POTENTIALLY WITH A NEW PRESCRIPTION, FOLLOWED BY A NEW ASSESSMENT.
DENIALS ARE CALLED TO DME SUPPLIER AND OR MEMBER.
THE PROCESS WILL START OVER POTENTIALLY WITH A NEW PRESCRIPTION, FOLLOWED BY A NEW ASSESSMENT.
DME SUPPLIER MAY NEED TO ORDER THE WHEEL CHAIR FROM THE MANUFACTURER. MEMBER HANG UP WHILE PROVIDING OTHER INFORMATION ABOUT THE BENEFITS.
.....
.....
FIG. 8

900

1

| 815 | 845 |
| --- | --- |
| THE PROCESS WILL START OVER POTENTIALLY WITH A NEW PRESCRIPTION, FOLLOWED BY A NEW ASSESSMENT. | IF AT ANY TIME DURING THE PROCESS A DECISION IS MADE TO C 820 , THE PROCESS WILL START ( / WITH A NEW PRESCRIPTION FOLLOWED BY A NEW ASSESSMENT. |
| THE PROCESS WILL START OVER POTENTIALLY WITH A NEW PRESCRIPTION, FOLLOWED BY A NEW ASSESSMENT. | DENIALS ARE C 825 PPLIER AND OR MEMBER. |
| THE PROCESS WILL START OVER POTENTIALLY WITH A NEW PRESCRIPTION, FOLLOWED BY A NEW ASSESSMENT. | DME SUPPLIER MAY NEED TO ORDER THE WHEEL CHAIR FR 830 TURER. MEMBER HANG UP WH HER INFORMATION ABOUT THE BENEFITS. |
| ..... | ..... |

905

2

| 815 | 845 | 910 |
| --- | --- | --- |
| THE PROCESS WILL START OVER POTENTIALLY WITH A NEW PRESCRIPTION, FOLLOWED BY A NEW ASSESSMENT. | IF AT ANY TIME DURING THE PROCESS A DECISION IS MADE TO C 820 , THE PROCESS WILL START ( / WITH A NEW PRESCRIPTION FOLLOWED BY A NEW ASSESSMENT. | 0.667 |
| THE PROCESS WILL START OVER POTENTIALLY WITH A NEW PRESCRIPTION, FOLLOWED BY A NEW ASSESSMENT. | DENIALS ARE 825 UPPLIER AND OR MEMBER. | 0 |
| THE PROCESS WILL START OVER POTENTIALLY WITH A NEW PRESCRIPTION, FOLLOWED BY A NEW ASSESSMENT. | DME SUPPLIER MAY NEED TO ORDER THE WHEEL CHAIR FR 830 TURER. MEMBER HANG UP WH HER INFORMATION ABOUT THE BENEFITS. | 0 |
| ..... | ..... | ..... |

MACHINE-LEARNING BASED IRRELEVANT SENTENCE CLASSIFIER

CROSS-REFERENCE TO RELATED APPLICATIONS

This application claims the benefit of U.S. Provisional Application No. 63/366,797, entitled "AUTOMATIC CALL SUMMARIZATION," and filed Jun. 22, 2022, the entire contents of which are hereby incorporated by reference.

BACKGROUND

Various embodiments of the present invention address technical challenges related to natural language processing such as, for example, for computer natural language comprehension. Various embodiments of the present invention address the shortcomings of natural language comprehension techniques and disclose various techniques for training and utilizing machine-learning based models to improve natural language comprehension without human intervention.

BRIEF SUMMARY

In general, embodiments of the present invention provide methods, apparatus, systems, computing devices, computing entities, and/or the like for processing text to improve machine narrative comprehension. Certain embodiments of the present invention utilize systems, methods, and computer program products that automatically train and utilize a machine-learning based classifier to improve machine narrative comprehension.

In accordance with one aspect, a method for machine narrative comprehension is provided. In one embodiment, the method comprises: receiving a narrative data object comprising one or more sentences; determining, using a machine-learning based irrelevant classifier model, a relevance of at least one sentence of the one or more sentences, wherein the relevance of the at least one sentence indicates that the at least one sentence is either: (i) a relevant sentence or (ii) an irrelevant sentence of the narrative data object; responsive to a determination that the at least one sentence is the irrelevant sentence, generating a pertinent summary by removing the at least one sentence from the narrative data object; and generating, based at least in part on the pertinent summary, an output indicia data object for the narrative data object.

In accordance with another aspect, an apparatus for machine narrative comprehension comprising at least one processor and at least one memory including computer program code is provided. In one embodiment, the at least one memory and the computer program code may be configured to, with the processor, cause the apparatus to: receive a narrative data object comprising one or more sentences; determine, using a machine-learning based irrelevant classifier model, a relevance of at least one sentence of the one or more sentences, wherein the relevance of the at least one sentence indicates that the at least one sentence is either: (i) a relevant sentence or (ii) an irrelevant sentence of the narrative data object; responsive to a determination that the at least one sentence is the irrelevant sentence, generate a pertinent summary by removing the at least one sentence from the narrative data object; and generate, based at least in part on the pertinent summary, an output indicia data object for the narrative data object.

In accordance with yet another aspect, a computer program product for machine narrative comprehension is provided. The computer program product may comprise at least one computer-readable storage medium having computer-readable program code portions stored therein, the computer-readable program code portions comprising executable portions configured to: receive a narrative data object comprising one or more sentences; determine, using a machine-learning based irrelevant classifier model, a relevance of at least one sentence of the one or more sentences, wherein the relevance of the at least one sentence indicates that the at least one sentence is either: (i) a relevant sentence or (ii) an irrelevant sentence of the narrative data object; responsive to a determination that the at least one sentence is the irrelevant sentence, generate a pertinent summary by removing the at least one sentence from the narrative data object; and generate, based at least in part on the pertinent summary, an output indicia data object for the narrative data object.

BRIEF DESCRIPTION OF THE DRAWINGS

Figure 1:
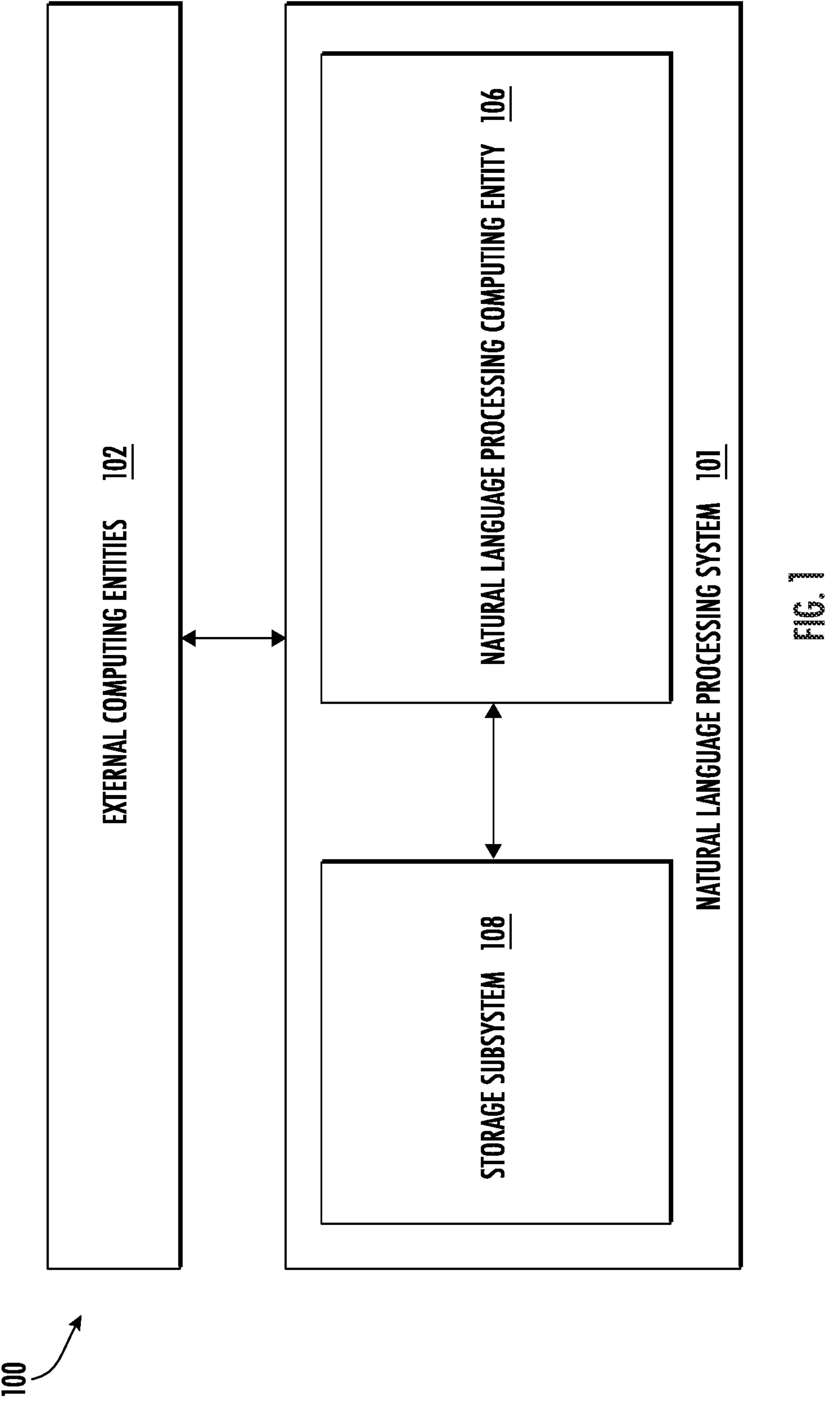

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
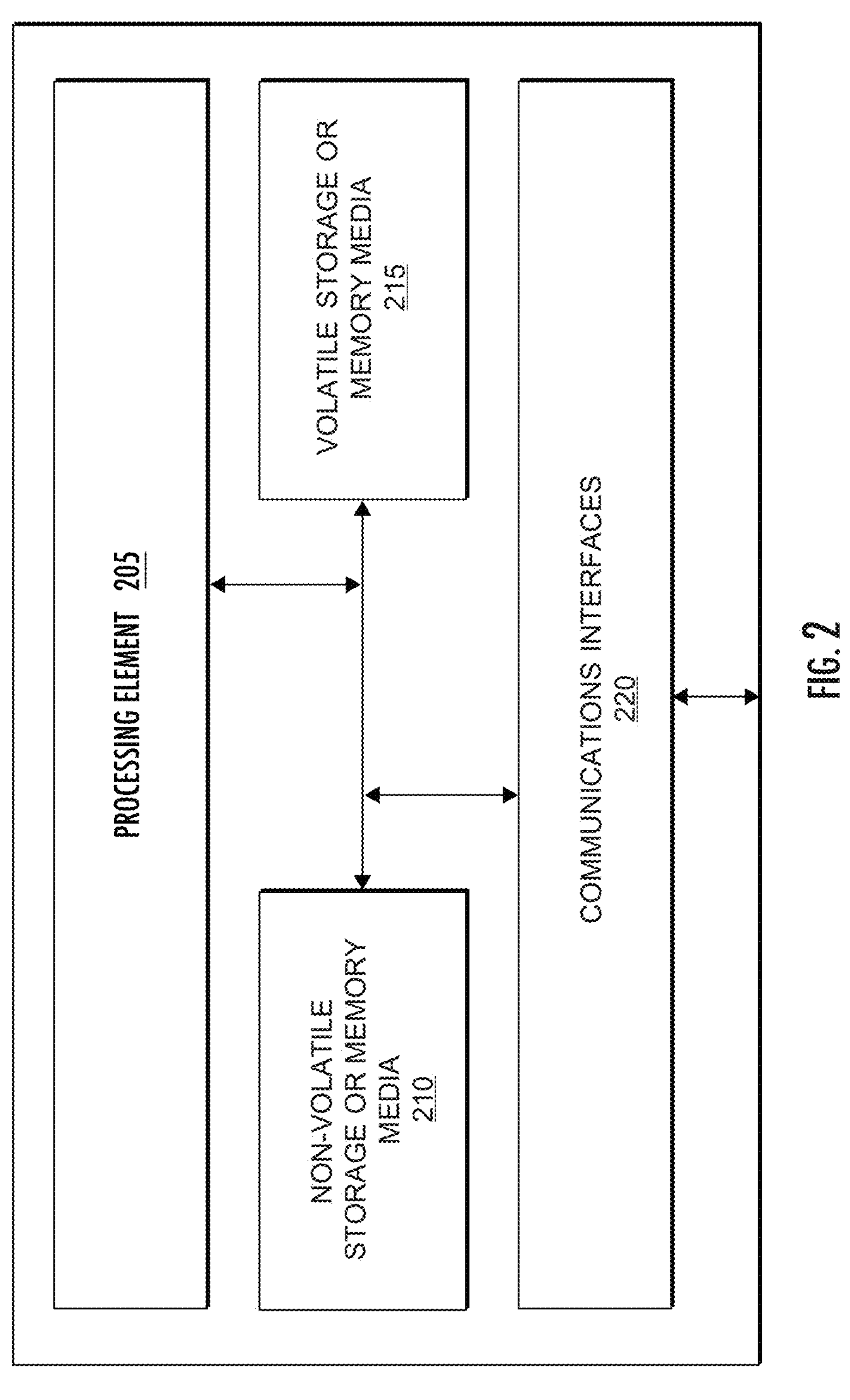

FIG. 2 provides an example natural language processing computing entity in accordance with some embodiments discussed herein.

Figure 3:
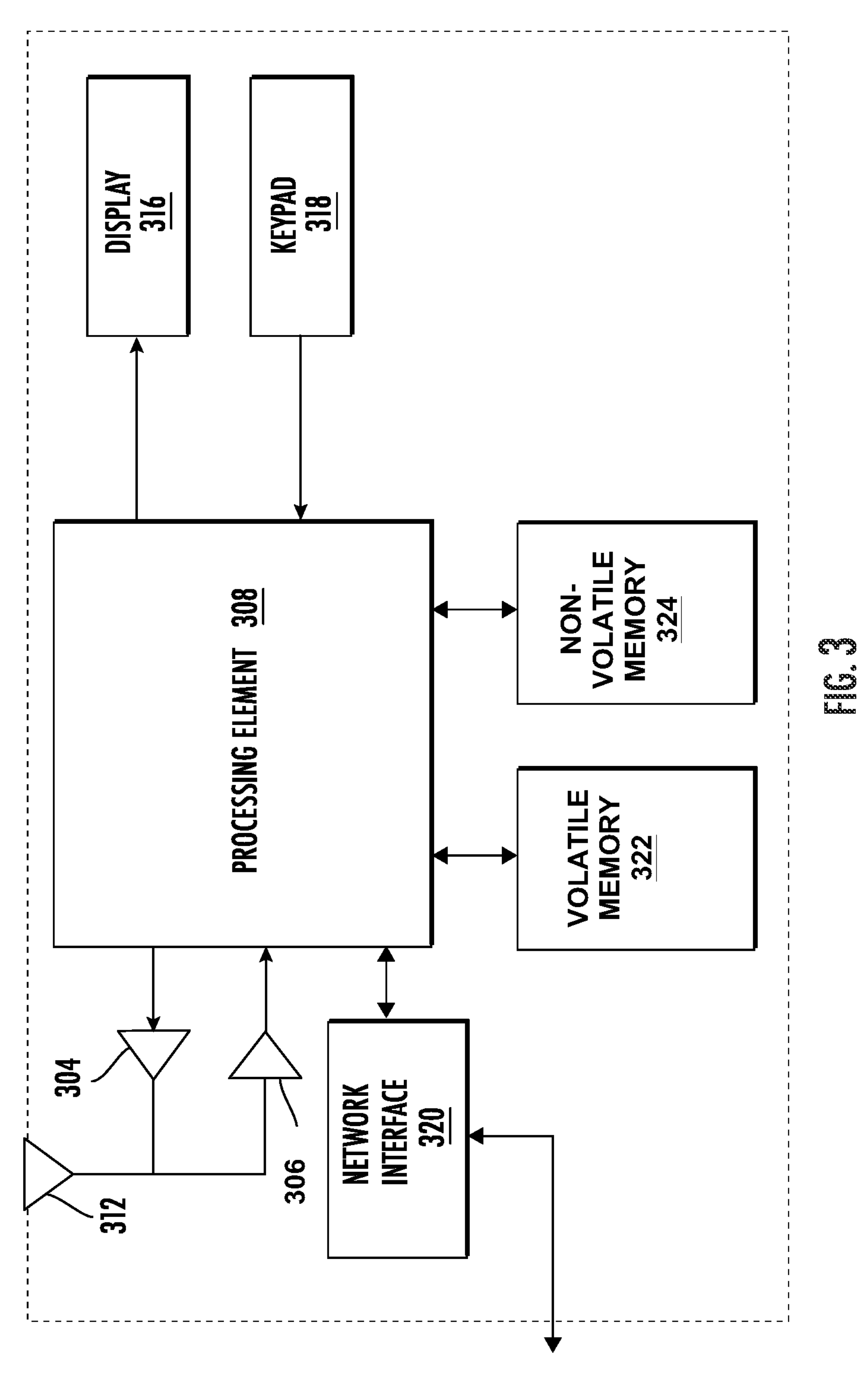

FIG. 3 provides an example external computing entity in accordance with some embodiments discussed herein.

Figure 4:
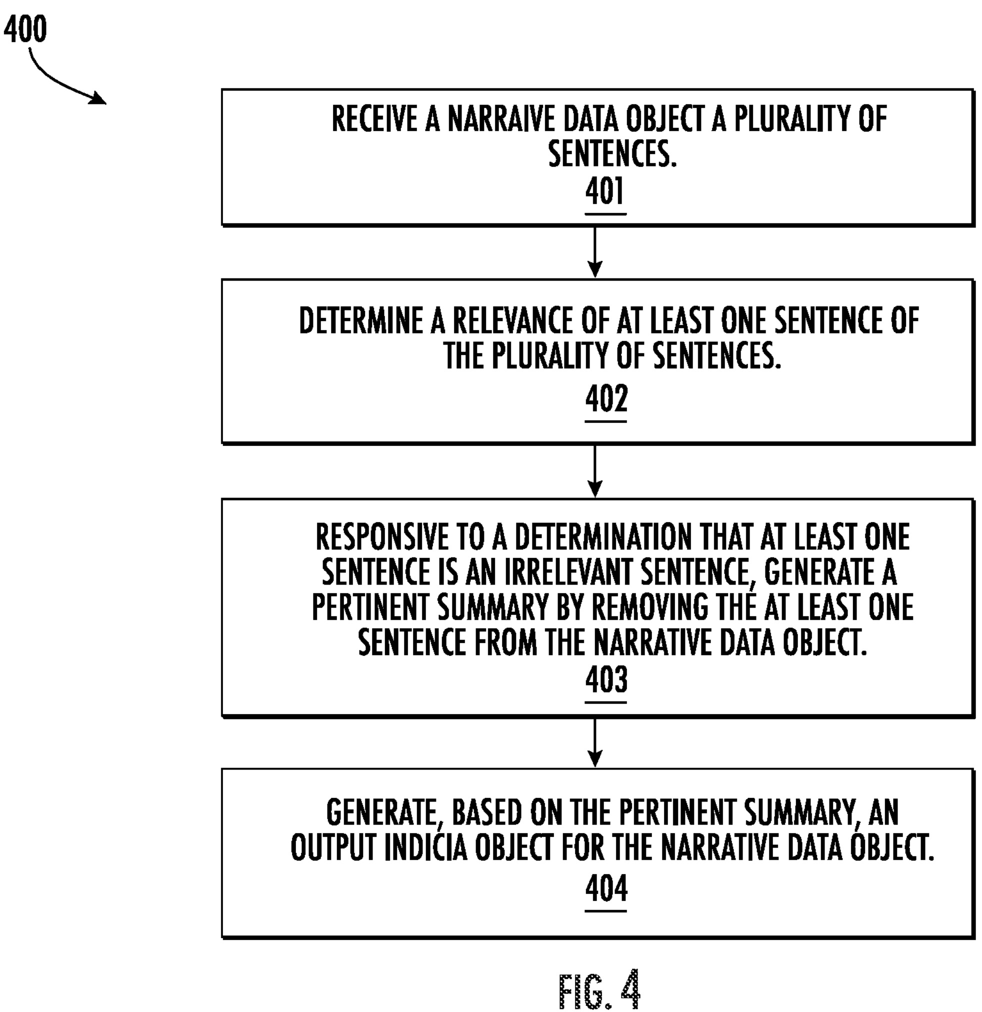

FIG. 4 is a flowchart diagram of an example process for generating a pertinent summary for a narrative data object in accordance with some embodiments discussed herein.

Figure 5:
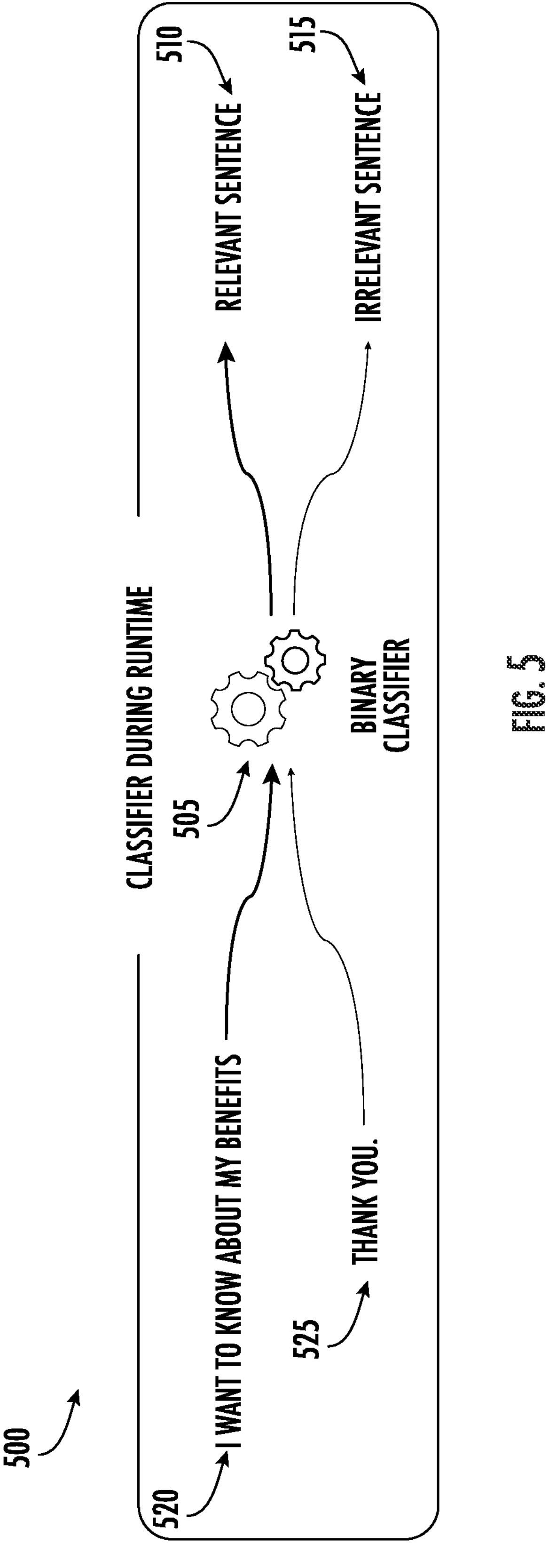

FIG. 5 provides an operational example of an irrelevant sentence classification process in accordance with some embodiments discussed herein.

Figure 6:
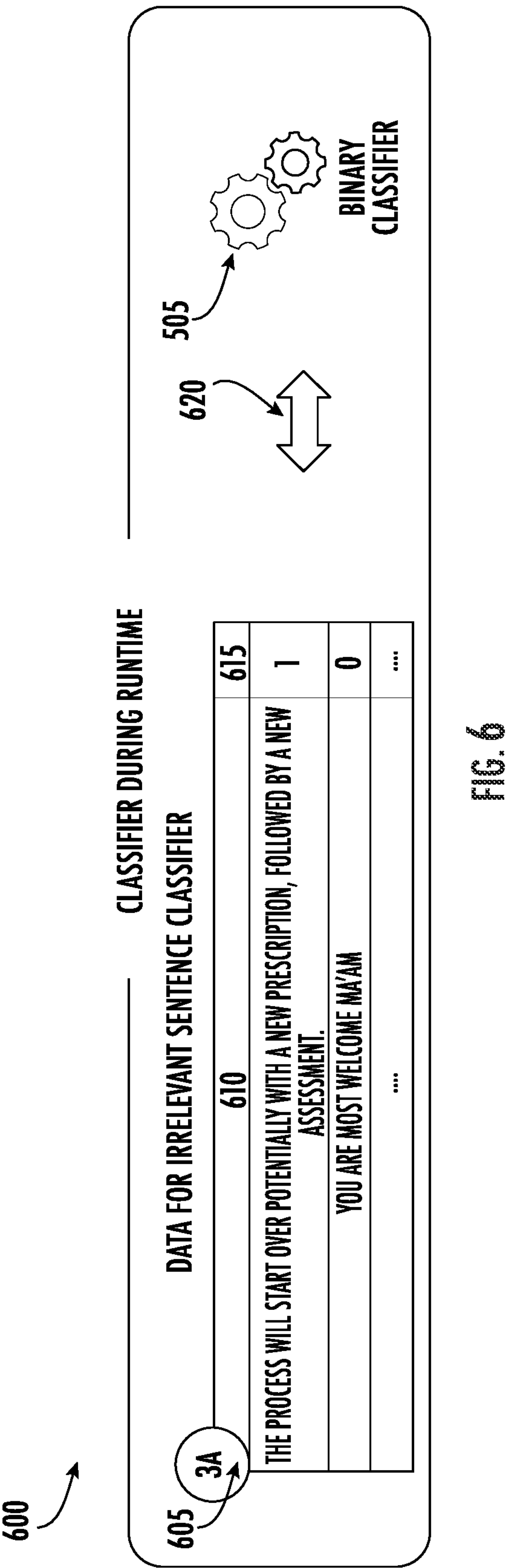

FIG. 6 provides an operational example of a training process for a machine-learning based irrelevant classifier model in accordance with some embodiments discussed herein.

Figure 7:
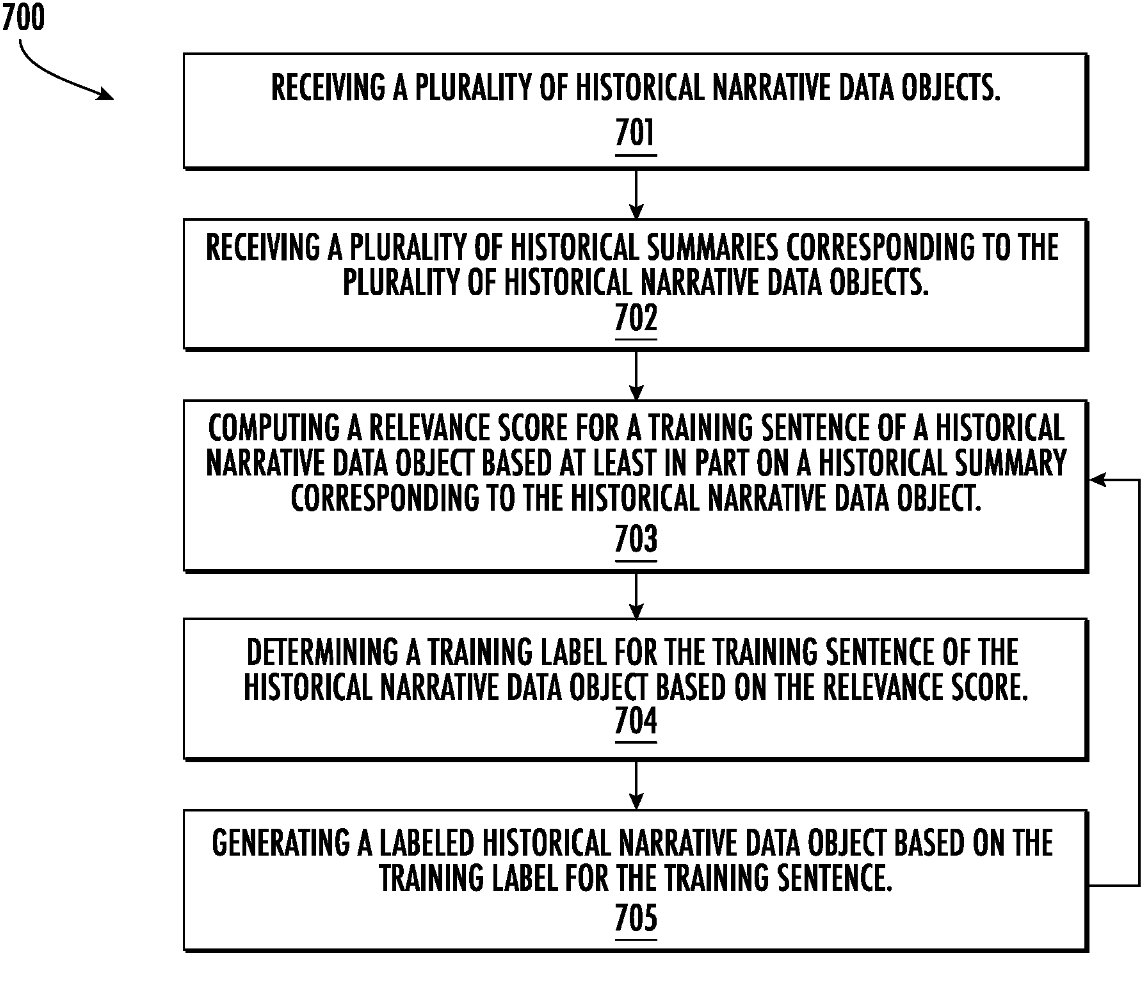

FIG. 7 is a flowchart diagram of an example automatic training data generation process for generating labeled training data for a machine-learning based model in accordance with some embodiments discussed herein.

FIG. 8 provides an operational example of a first phase for an automatic training data generation process in accordance with some embodiments discussed herein.

FIG. 9 provides an operational example of a second phase for an automatic training data generation process in accordance with some embodiments discussed herein.

Figure 10:
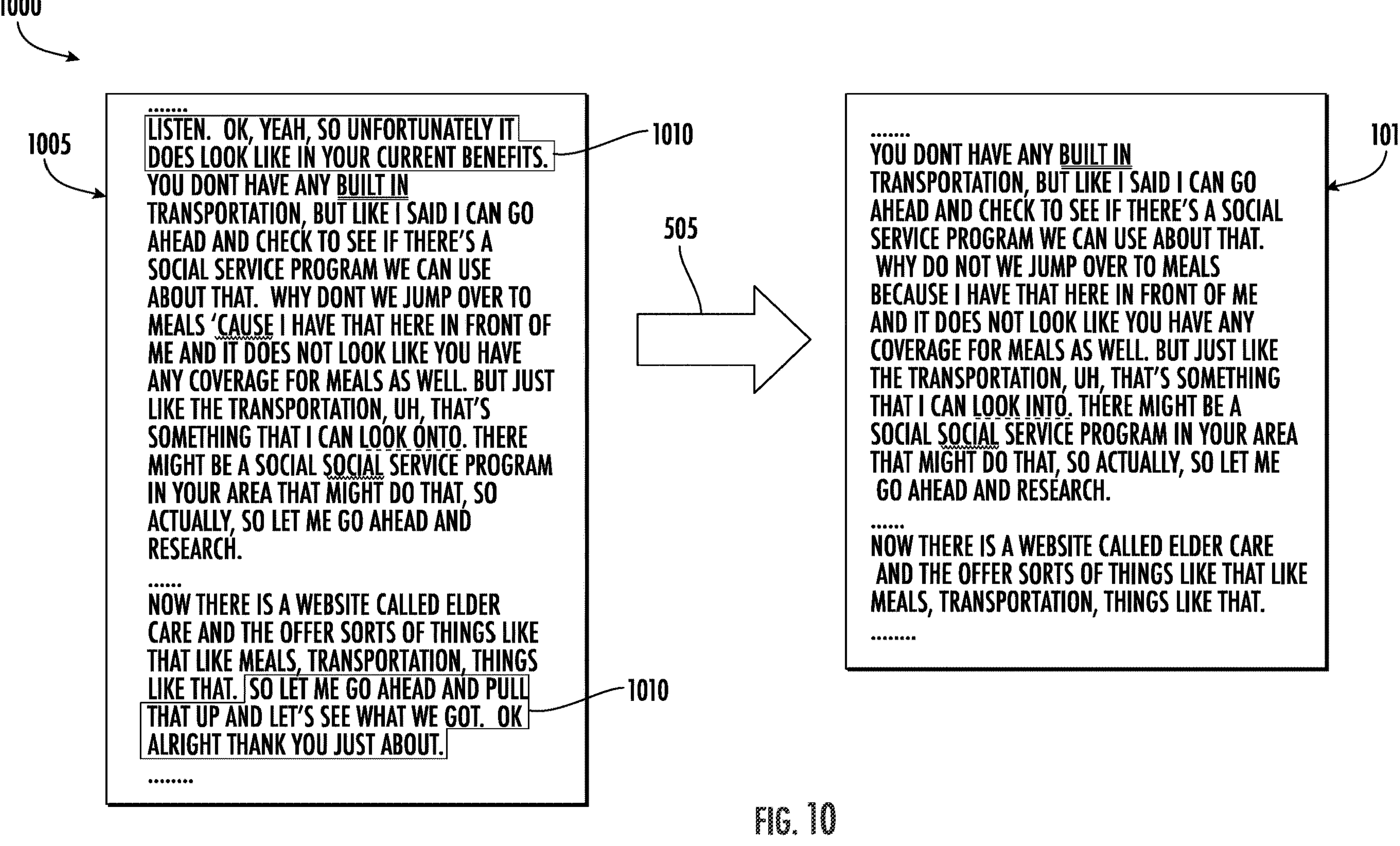

FIG. 10 provides an operational example of an irrelevant sentence removal process in accordance with some embodiments discussed herein.

Figure 11:
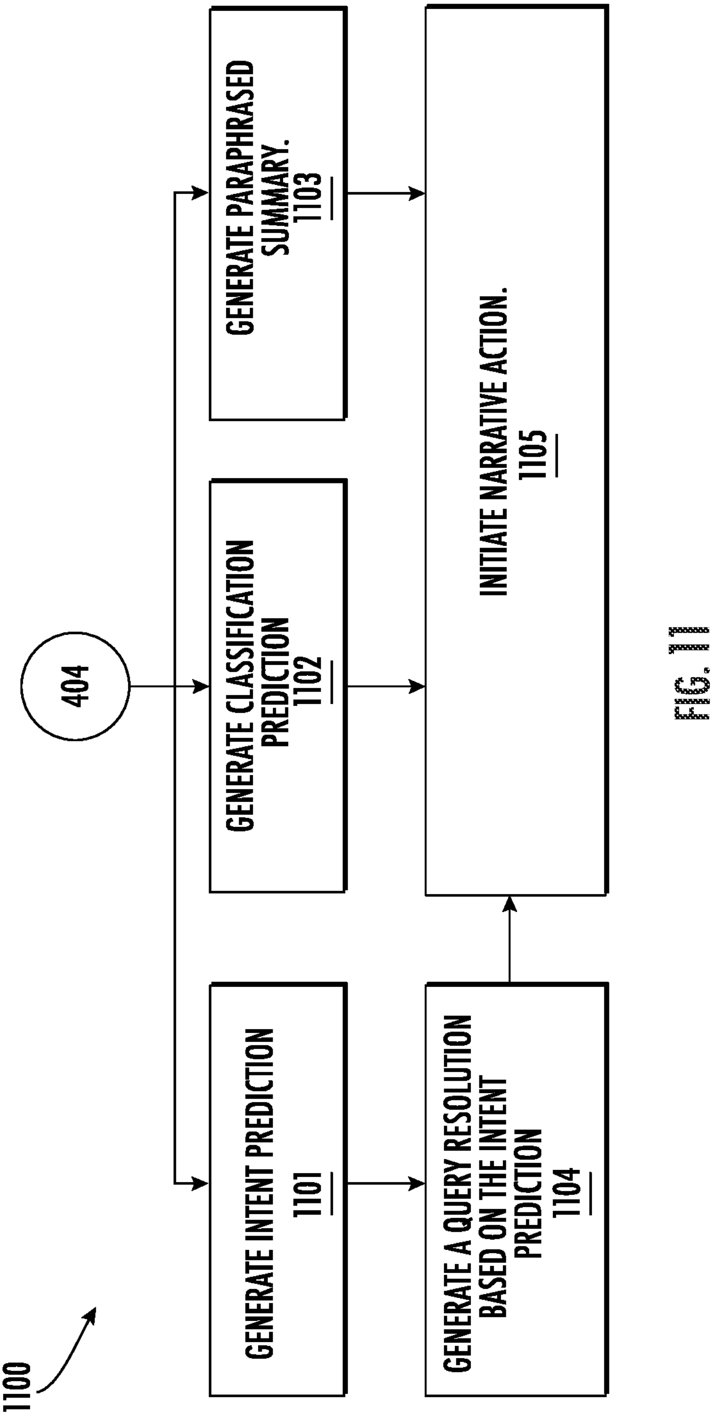

FIG. 11 is a flowchart diagram of an example process for initiating an action, based at least in part on an output indicia data object in accordance with some embodiments discussed herein.

DETAILED DESCRIPTION

Various embodiments of the present invention now will be described more fully herein with reference to the accompanying drawings, in which some, but not all, embodiments of the inventions are shown. Indeed, these inventions can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to textual data analysis, one of ordinary skill in the art will recognize that the disclosed concepts can be used to perform other types of data analysis.

I. Overview

Aspects of the present invention present new natural language processing techniques to improve natural language comprehension by removing irrelevant sentences from a natural language narrative. The irrelevant sentence classification method utilizes new training techniques to train a new machine-learning based classification model to identify and remove irrelevant sentences from a multi-sentence narrative without additional context. The methods and systems of the present disclosure can utilize the new machine-learning based model to generate a pertinent summary for a narrative that captures important impressions of the narrative such as, for example, a participant's intent behind the narrative, and removes irrelevant information that does not contribute to the captured impression. The pertinent summary can be leveraged to improve computer reasoning of natural language narratives and enhance computer recall and storage capabilities for such narratives.

According to some aspects of the present invention, a narrative data object is processed by a machine-learning based irrelevant classifier model to determine the relevance of each sentence of the narrative. The relevance of each sentence of the narrative is utilized to generate a pertinent summary of the narrative that removes irrelevant sentences from the narrative. The machine-learning based irrelevant classifier model is trained to individually determine the relevance of each sentence without additional contextual data. In this manner, the present invention provides a practical improvement over traditional natural language processing techniques by identifying a general relevance of a sentence without contextual data.

The machine-learning based irrelevant classifier model is trained using new training techniques that leverage historical contextual summaries of historical narratives to automatically generate a robust, multi-facetted, training dataset that can be tailored to any application. The training dataset, for example, can include an automatically labeled dataset that can be generated based at least in part on contextual summaries for historical narratives related to different categories. A different training dataset can be automatically generated based at least in part on the intended function of the machine-learning based irrelevant classifier model. As an example, contextual call summaries that capture the intent of a customer during a customer service narrative, can be used for automatically generating a training dataset for training the machine-learning based irrelevant classifier model to identify sentences of a narrative that are relevant to a customer's intent. As another example, contextual call summaries that capture a resolution for a customer during a customer service narrative can be used for automatically generating a training dataset for training the machine-learning based irrelevant classifier model to identify sentences of a narrative that are relevant to a customer resolution. In this manner, the existing data can be leveraged in a new training pipeline to train multiple versions of a machine-learning based model to determine a relevance of sentence depending on the circumstance.

In some embodiments, the new training techniques can leverage contextual summaries automatically generated using automatic text summarization techniques in a fully automated training pipeline. Moreover, real-time summaries can be leveraged to continually refine relevance outputs of the machine-learning based irrelevant classifier model based at least in part on dynamic changes in relevant considerations as expressed by the real-time summaries. In this manner, the present disclosure provides an improvement to traditional machine-learning based training techniques by enabling the dynamic generation of new training data.

According to some aspects of the present invention, the natural language processing techniques described herein can be utilized as a pre-processing operation to improve computer natural language comprehension. For instance, the natural language processing techniques can be utilized to generate a pertinent summary of a narrative data object that can be further processed by another algorithm such as, for example, an intent prediction model, a classification model, text summarization models, etc. to improve the performance for each model by removing irrelevant and potentially misleading information from the narrative data object.

As one example, a machine-learning based intent prediction model can be configured to generate an intent prediction based at least in part on the one or more sentences of a narrative. The performance of conventional intent classification models can be impacted by irrelevant sentences. For example, an irrelevant sentence can lead to erroneous intent predictions by including terminology and/or phrases that can mislead the machine-learning based intent prediction model. By removing irrelevant sentences before generating an intent prediction, the natural language processing techniques described herein can improve the accuracy for intent predictions output by the intent prediction model. This can be especially advantageous for automatic robotic assistants.

Exemplary inventive and technologically advantageous aspects of the present invention include: (i) techniques for identifying irrelevant sentences in a narrative without contextual data; (ii) techniques for training machine-learning based models; and (iii) techniques for the automatic generation of training data for machine-learning based models. The present invention provides a new text processing technique that leverages historical data to remove irrelevant features from a narrative to improve computer natural language comprehension.

II. Definitions

The term "narrative data object" can refer to a data entity that is configured to describe at least a portion of a narrative transcript. A narrative transcript can include a plurality of sentences describing a temporal flow of verbal and/or textual communications spoken and/or transcribed by at least one party to a narrative. The narrative, for example, can include a single and/or multi-party communication including one or more impressions conveyed by a party to the narrative. The narrative data object can be associated with a narrative transcript that includes a textual representation of a narrative. One example of a narrative transcript is at least a portion of a multi-party interaction transcript.

The term "multi-party interaction transcript" can refer to a data entity that is configured to describe a temporal flow of verbal interactions between at least two interaction participants. An example of a multi-party interaction transcript is a call transcript between at least two participants of a call, such as a call transcript for a call between a customer service agent and a customer. In the noted example, the call transcript can describe verbal interactions by the participants in a temporally sequential manner, where each verbal interaction by a participant can include one or more utterances (e.g., each including one or more sentences). For example, with respect to the call transcript for a call between a customer service agent and a customer, the call transcript can describe that a first utterance by the customer service agent (e.g., "Hello, how is your day today. How can I help you?") is temporally followed by a second utterance by the customer (e.g., "Thank you. I'm doing well. I am trying to check my account balance."), which can then be temporally followed by a third utterance by the customer service agent, and so on. Other examples of multi-party interaction transcripts include meeting transcripts, conference call transcripts, auction transcripts, chat-bot transcripts, and/or the like. A narrative data object can include at least a portion of the multi-party interaction transcript.

The term "interaction utterance" can refer to a data entity that is configured to describe a semantically coherent unit of words that is recorded by a narrative transcript. An example of an interaction utterance is one or more sequential sentences attributed to at least one participant of a narrative transcript. In some embodiments, to detect interaction utterances in a multi-party interaction transcript, a natural language processing computing entity utilizes one or more speech fragmentation algorithms, such as one or more sentence detection algorithms. Each interaction utterance in a multi-party interaction transcript is typically associated with an interaction participant of the plurality of interaction participants that are in turn associated with the multi-party interaction transcript. Accordingly, in some embodiments, the interaction utterances in a multi-party interaction transcript can be divided into two or more subsets, where each subset includes the set of interaction utterances in a multi-party interaction transcript that is associated with a particular interaction participant of the two or more interaction participants.

The term "interaction participant" can refer to a human or computer entity that takes part in a narrative. For example, an interaction participant can include a customer service agent and a customer that takes part in a customer service call. As another example, an interaction participant can include an automated customer service robot and a customer that takes part in a customer service text exchange. For instance, the automated customer service robot can be configured to analyze interaction utterances by the customer, determine an automated response based at least in part on the interaction utterances, and provide the automated response to the customer.

III. Computer Program Products, Methods, and Computing Entities

Embodiments of the present invention can be implemented in various ways, including computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present invention can also be implemented as methods, apparatus, systems, computing devices, computing entities, and/or the like. As such, embodiments of the present invention can take the form of an apparatus, system, computing device, computing entity, and/or the like, executing instructions stored on a computer-readable storage medium to perform certain steps or operations. Thus, embodiments of the present invention can also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing machine text processing. The architecture 100 includes a natural language processing system 101 configured to receive text processing requests from external computing entities 102, process the text processing requests to generate predictions, provide the generated predictions to the external computing entities 102, and automatically perform prediction-based actions based at least in part on the generated predictions. An example of a prediction that can be generated using the natural language processing system 101 is a prediction about relevance of one or more portions of a natural language document, such as relevance of a sentence in a transcript.

In some embodiments, natural language processing system 101 can communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The natural language processing system 101 can include a natural language processing computing entity 106 and a storage subsystem 108. The natural language processing computing entity 106 can be configured to receive text processing requests from one or more external computing entities 102, process the text processing requests to generate predictions corresponding to the text processing requests, provide the generated predictions to the external computing entities 102, and automatically perform prediction-based actions based at least in part on the generated predictions.

The storage subsystem 108 can be configured to store input data used by the natural language processing computing entity 106 to perform text processing as well as model definition data used by the natural language processing computing entity 106 to perform various text processing tasks. The storage subsystem 108 can include one or more storage units, such as multiple distributed storage units that are connected through a computer network. Each storage unit in the storage subsystem 108 can store at least one of one or more data assets and/or one or more data about the computed properties of one or more data assets. Moreover, each storage unit in the storage subsystem 108 can include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Natural Language Processing Computing Entity

FIG. 2 provides a schematic of a natural language processing computing entity 106 according to one embodiment of the present invention. In general, the terms computing entity, computer, entity, device, system, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the natural language processing computing entity 106 can also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the natural language processing computing entity 106 can include, or be in communication with, one or more processing elements 205 (also referred to as processors, processing circuitry, and/or similar terms used herein interchangeably) that communicate with other elements within the natural language processing computing entity 106 via a bus, for example. As will be understood, the processing element 205 can be embodied in a number of different ways.

For example, the processing element 205 can be embodied as one or more complex programmable logic devices (CPLDs), microprocessors, multi-core processors, coprocessing entities, application-specific instruction-set processors (ASIPs), microcontrollers, and/or controllers. Further, the processing element 205 can be embodied as one or more other processing devices or circuitry. The term circuitry can refer to an entirely hardware embodiment or a combination of hardware and computer program products. Thus, the processing element 205 can be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 can be configured for a particular use or configured to execute instructions stored in volatile or non-volatile media or otherwise accessible to the processing element 205. As such, whether configured by hardware or computer program products, or by a combination thereof, the processing element 205 can be capable of performing steps or operations according to embodiments of the present invention when configured accordingly.

In one embodiment, the natural language processing computing entity 106 can further include, or be in communication with, non-volatile media (also referred to as non-volatile storage, memory, memory storage, memory circuitry and/or similar terms used herein interchangeably). In one embodiment, the non-volatile storage or memory can include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity—relationship model, object model, document model, semantic model, graph model, and/or the like.

In one embodiment, the natural language processing computing entity 106 can further include, or be in communication with, volatile media (also referred to as volatile storage memory, memory storage, memory circuitry and/or similar terms used herein interchangeably). In one embodiment, the volatile storage or memory can also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like can be used to control certain aspects of the operation of the natural language processing computing entity 106 with the assistance of the processing element 205 and operating system.

As indicated, in one embodiment, the natural language processing computing entity 106 can also include one or more communications interfaces 220 for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the natural language processing computing entity 106 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the natural language processing computing entity 106 can include, or be in communication with, one or more input elements, such as a keyboard input, a mouse input, a touch screen/display input, motion input, movement input, audio input, pointing device input, joystick input, keypad input, and/or the like. The natural language processing computing entity 106 can also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, can include signaling information/data in accordance with air interface standards of applicable wireless systems. In this regard, the external computing entity 102 can be capable of operating with one or more air interface standards, communication protocols, modulation types, and access types. More particularly, the external computing entity 102 can operate in accordance with any of a number of wireless communication standards and protocols, such as those described above with regard to the natural language processing computing entity 106. In a particular embodiment, the external computing entity 102 can operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 can operate in accordance with multiple wired communication standards and protocols, such as those described above with regard to the natural language processing computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 can include location determining aspects, devices, modules, functionalities, and/or similar words used herein interchangeably. For example, the external computing entity 102 can include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites can be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as Decimal Degrees (DD); Degrees, Minutes, Seconds (DMS); Universal Transverse Mercator (UTM); Universal Polar Stereographic (UPS) coordinate systems; and/or the like.

Alternatively, the location information/data can be determined by triangulating the external computing entity's 102 position in connection with a variety of other systems, including cellular towers, Wi-Fi access points, and/or the like. Similarly, the external computing entity 102 can include indoor positioning aspects, such as a location module adapted to acquire, for example, latitude, longitude, altitude, geocode, course, direction, heading, speed, time, date, and/or various other information/data. Some of the indoor systems can use various position or location technologies including RFID tags, indoor beacons or transmitters, Wi-Fi access points, cellular towers, nearby computing devices (e.g., smartphones, laptops) and/or the like. For instance, such technologies can include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 can also comprise a user interface (that can include a display 316 coupled to a processing element 308) and/or a user input interface (coupled to a processing element 308). For example, the user interface can be a user application, browser, user interface, and/or similar words used herein interchangeably executing on and/or accessible via the external computing entity 102 to interact with and/or cause display of information/data from the natural language processing computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and can include a full set of alphabetic keys or set of keys that can be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or can be removable. For example, the non-volatile memory can be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The volatile memory can be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this can include a user application that is resident on the entity or accessible through a browser or other user interface for communicating with the natural language processing computing entity 106 and/or various other computing entities.

In another embodiment, the external computing entity 102 can include one or more components or functionality that are the same or similar to those of the natural language processing computing entity 106, as described in greater detail above. As will be recognized, these architectures and descriptions are provided for exemplary purposes only and are not limited to the various embodiments.

In various embodiments, the external computing entity 102 can be embodied as an artificial intelligence (AI) computing entity, such as an Amazon Echo, Amazon Echo Dot, Amazon Show, Google Home, and/or the like. Accordingly, the external computing entity 102 can be configured to provide and/or receive information/data from a user via an input/output mechanism, such as a display, a camera, a speaker, a voice-activated input, and/or the like. In certain embodiments, an AI computing entity can comprise one or more predefined and executable program algorithms stored within an onboard memory storage module, and/or accessible over a network. In various embodiments, the AI computing entity can be configured to retrieve and/or execute one or more of the predefined program algorithms upon the occurrence of a predefined trigger event.

V. Exemplary System Operations

FIG. 4 is a flowchart diagram of an example process 400 for generating a pertinent summary for a narrative data object in accordance with some embodiments discussed herein. Via the various steps/operations of the process 400, the natural language processing computing entity 106 can generate pertinent summaries with relevant information in an efficient and reliable manner.

At step/operation 401, the process 400 can include receiving a narrative data object including one or more sentences. For example, the natural language processing computing entity 106 can receive the narrative data object including one or more sentences. The narrative data object can include at least a portion of a narrative transcript describing a temporal flow of verbal and/or textual communications spoken and/or transcribed by at least one party to a narrative. The narrative, for example, can include a single and/or multi-party communication including one or more impressions conveyed by a party to the narrative.

An impression can include an intention for the narrative such as, for example, a request for information, a request for the performance of an action, and/or any other reason for one party to participate in the narrative. In addition, or alternatively, an impression can include a resolution for the narrative such as, for example, an answer to the request for information, an affirmation of an action in response to a request, and/or any other resolution for a party's reason for participating in the narrative.

As one example, a narrative transcript can include a single-party transcript that can include a plurality of utterances (e.g., each including one or more sentences) describing one or more impressions conveyed by a single narrative participant. The narrative data object, for example, can be a multi-sentence question, statement, review, etc. provided by the narrative participant. By way of example, the narrative participant can include a customer, member, etc. of an agency. The narrative data object can include an audio message, letter, email, review, and/or any other form of verbal or textual communication to the agency.

In another example, the narrative transcript can include a multi-party interaction transcript that can describe a temporal flow of interactions between two or more interaction participants. An example of a multi-party interaction transcript is a call transcript between at least two participants of a call, such as a call transcript for a call between a customer service agent and a customer. In the noted example, the call transcript can describe verbal interactions by the participants in a temporally sequential manner, where each verbal interaction by a participant can include one or more utterances (e.g., each including one or more sentences).

For example, with respect to the call transcript for a call between a customer service agent and a customer, the call transcript can describe that a first utterance by the customer service agent (e.g., "Hello, how is your day today. How can I help you?") is temporally followed by a second utterance by the customer (e.g., "Thank you. I'm doing well. I am trying to check my account balance."), which can then be temporally followed by a third utterance by the customer service agent, and so on. Other examples of multi-party interaction transcripts include meeting transcripts, conference call transcripts, auction transcripts, chat-bot transcripts, and/or the like.

The narrative transcript (e.g., a single-party transcript, multi-party interaction transcript, etc.) can be a spoken interaction (e.g., a phone call, etc.) or a textual interaction. The natural language processing computing entity 106 can receive the narrative data object from at least one participant of a textual interaction or record the narrative data object during the textual interaction. In addition, or alternatively, the natural language processing computing entity 106 can receive audio data for a spoken interaction and leverage speech to text functionalities to generate the narrative data object.

The narrative can be associated with one or more interaction participants, where each interaction participant describes a participant in the narrative. While various embodiments of the present invention are described with reference to two-party interaction transcripts and/or with reference to call transcripts, a person of ordinary skill in the relevant technology will recognize that the disclosed techniques can be utilized to process transcripts associated with any number of interaction participants as well as any type of interaction, such as, for example, to generate an intent prediction for automatic robotic assistants, etc.

A narrative transcript can include a plurality of interaction utterances from at least one participant of the narrative. Each interaction utterance can include one or more sequential sentences associated with the participant. An interaction utterance, for example, can include any semantically coherent unit of words that is recorded by the narrative transcript.

In some embodiments, to detect interaction utterances in a narrative transcript, the natural language processing computing entity 106 can utilize one or more speech fragmentation algorithms, such as one or more sentence detection algorithms. Each interaction utterance in a narrative transcript can be associated with a respective interaction participant of the narrative transcript. In some embodiments, the interaction utterances in a multi-party interaction transcript can be divided into two or more subsets, where each subset includes the set of interaction utterances in a multi-party interaction transcript that is associated with a particular interaction participant of the two or more interaction participants.

At step/operation 402, the process 400 can include determining a relevance of at least one sentence of the one or more sentences of the narrative data object. For example, the natural language processing computing entity 106 can determine the relevance of the at least one sentence of the narrative data object using a machine-learning based irrelevant classifier model. By way of example, the natural language processing computing entity 106 can process the narrative data object with the machine-learning based irrelevant classifier model to determine the relevance of the at least one sentence.

The relevance of the at least one sentence can include a range, percentage, and/or a binary indicator indicative of the relevance of the at least one sentence to an impression of the narrative. In some embodiments, the relevance can include a binary classification. The binary classification can include: (i) a relevant classification indicating that the at least one sentence is predicted to be relevant to an impression of the narrative; or (ii) an irrelevant classification indicating the at least one sentence is predicted to be irrelevant to the impression of the narrative. The relevant classification can indicate that the at least one sentence is a relevant sentence of the narrative data object and should be used for interpreting and/or contextualizing an impression of the narrative. The irrelevant classification can indicate that the at least one sentence is an irrelevant sentence of the narrative data object and should not be used for interpreting and/or contextualizing an impression of the narrative.

The relevance of the at least one sentence can be determined without knowledge of a particular impression of the narrative data object. The relevance, for example, can include a prediction of the relevance of a particular sentence based at least in part on historical information. By way of example, the relevance of the at least one sentence can be determined using a machine-learning based irrelevant classifier model that is trained using historical information.

FIG. 5 provides an operational example of an irrelevant sentence classification process 500 in accordance with some embodiments discussed herein. The irrelevant sentence classification process 500 utilizes a machine-learning based irrelevant classifier model 505 to assign a binary classification to one or more sentences of the narrative data object. The binary classification, for example, can include a relevant classification 510 and an irrelevant classification 515. The one or more sentences of the narrative data object, for example, can include a first example sentence 520 of the narrative data object and a second example sentence 525 of the narrative data object. The first example sentence 520 of the narrative data object can be processed (e.g., input to, etc.) by the machine-learning based irrelevant classifier model 505 and assigned a relevant classification 510. The second example sentence 525 of the narrative data object can be processed (e.g., input to, etc.) by the machine-learning based irrelevant classifier model 505 and assigned an irrelevant classification 515.

In some embodiments, the natural language processing computing entity 106 can individually generate a binary classification for each sentence of the narrative data object. For instance, the natural language processing computing entity 106 can select the first example sentence 520 of the narrative data object and individually process the first example sentence 520 with the machine-learning based irrelevant classifier model 505 to generate the relevant classification 510 without additional data associated with the narrative data object. The natural language processing computing entity 106 can select the second example sentence 525 of the narrative data object and individually process the second example sentence 525 with the machine-learning based irrelevant classifier model 505 to generate the irrelevant classification 515 without additional data associated with the narrative data object. This process can be repeated for each sentence of the narrative data object to individually generate a binary classification for each sentence of the narrative data object. Each sentence of the narrative data object can be processed individually based at least in part on the words, terms, phrases, etc. of the respective sentence, without contextual data from the narrative data object.

The machine-learning based irrelevant classifier model can include any type of machine-learning based model including one or more supervised, unsupervised, and/or reinforcement learning based models. In some implementations, the machine-learning based irrelevant classifier model can include a binary classification model. For instance, the machine-learning based irrelevant classifier model can include any combination of a naïve bayes, logistic regression, k-nearest neighbors, support vector machine, decision tree, random forest, voting classification, neural network, and/or any other binary classification method. In some embodiments, the machine-learning based irrelevant classifier model can include a transformer-based machine-learning model for natural language processing such as, for example, a Bidirectional Encoder Representations from Transformers (BERT) model.

The machine-learning based irrelevant classifier model can be previously trained using machine-learning based training techniques to output binary classifications for a respective sentence indicative of a relevance of the sentence without contextual information.

For example, FIG. 6 provides an operational example of a training process 600 for a machine-learning based irrelevant classifier model 505 in accordance with some embodiments discussed herein. The machine-learning based irrelevant classifier model 505 is previously trained using supervisory training techniques 620 based at least in part on labeled training data 605. The labeled training data 605 includes a plurality of labeled historical narrative data objects. Each labeled historical narrative data object includes a training sentence 610 of a historical narrative data object and a training label 615 indicative of a relevance of the training sentence 610. The training label is a binary classification. The binary classification, for example, can include: (i) a first classification (e.g., a "1") to identify that a training sentence 610 is a relevant training sentence and (ii) a second classification (e.g., a "0") to identify that a training sentence 610 is an irrelevant training sentence. The supervisory training techniques 620 can include inputting the training sentences 610 to the machine-learning based irrelevant classifier model 505 and modifying one or more parameters of the machine-learning based irrelevant classifier model 505 based at least in part on the corresponding training labels 615.

FIG. 7 is a flowchart diagram of an example automatic training data generation process 700 for generating labeled training data for a machine-learning based model in accordance with some embodiments discussed herein.

At step/operation 701, the process 700 can include receiving a plurality of historical narrative data objects. For example, the natural language processing computing entity 106 can receive the plurality of historical narrative data objects. A historical narrative data object can include at least a portion of a historical narrative transcript describing a temporal flow of verbal and/or textual communications spoken and/or transcribed by at least one party to a historical narrative. The historical narrative, for example, can include a previously conveyed single and/or multi-party communication.

At step/operation 702, the process 700 can include receiving a plurality of historical summaries corresponding to the plurality of historical narrative data objects. The historical narrative data objects, for example, can include a plurality of historical narrative sentences of a historical narrative transcript. A historical summary for a corresponding historical narrative data object can include one or more historical summary sentences associated with the plurality of historical narrative sentences. The plurality of historical narrative sentences, for example, can convey at least one impression of a historical narrative. The one or more historical summary sentences can convey the at least one impression of the historical narrative through a summary of the plurality of historical narrative sentences.

The plurality of historical narrative data objects and corresponding historical summaries can be stored as a historical training dataset. The plurality of historical summaries can include transcript summaries prepared to memorialize a respective narrative. The transcript summary, for example, can include a reported contextual summary manually transcribed by a participant to a respective narrative. As one example, a transcript summaries can include a call summary transcribed to summarize a customer service call that is prepared by an agent to satisfy compliance criteria and/or improve call handling.

In addition, or alternatively, the transcript summary can include a reported contextual summary automatically generated using one or more extractive and/or abstractive summarization techniques.

In some embodiments, the plurality of historical narrative data objects and corresponding historical summaries can include a subset of past narrative summary pairs. The subset can be intelligently selected from the past narrative summary pairs based at least in part on a summary of each of the past narrative summary pairs. For example, the natural language processing computing entity 106 can evaluate each respective past narrative summary pair based at least in part on one or more summary metrics of a summary of the respective narrative summary pair. The summary metrics can include, for example, a summary length (e.g., one or more sentences, etc.), a summary text quality (e.g., presence of prohibited characters, etc.), a summary content quality (e.g., whether the summary details an impression of the corresponding narrative, etc.), and/or any other metrics for differentiating a desired summary from undesirable summaries based at least in part on the particular application. In some embodiments, the summary metrics can include author metrics indicative of a quality of the author of a respective summary. The author metrics can be indicative of a reliability of a human author and/or automatic summarization technique.

FIG. 8 provides an operational example of a first phase 800 for an automatic training data generation process in accordance with some embodiments discussed herein. As described herein, a historical training dataset includes a plurality of historical narrative data objects and corresponding historical summaries such as, for example, the historical narrative data object 805 and the historical summary 810. The historical narrative data object 805 includes a narrative transcript comprising a plurality of historical narrative sentences including, for example, a training sentence 815 and one or more additional sentences. The example historical summary 810 includes one or more historical summary sentences associated with the plurality of historical narrative sentences. By way of example, the historical summary 810 can include an example summary sentence 820 that is associated with the training sentence 815.

The historical summary 810 includes a contextual summary of the historical narrative data object 805. For instance, the one or more historical summary sentences can convey at least one impression of the narrative through a summary of the plurality of historical narrative sentences. As an example, the summary sentence 820 can convey an impression of the narrative that is based at least in part on the training sentence 815.

A labeled historical narrative data object can be automatically generated based at least in part on a plurality of historical narrative data objects and a plurality of historical summaries corresponding to the plurality of historical narrative data objects. To do so, the natural language processing computing entity 106 can extract each individual sentence from the historical narrative data object 805 to generate a listing of historical transcript sentences. In addition, or alternatively, the natural language processing computing entity 106 can extract each individual sentence from the historical summary 810 to generate a listing of historical summary sentences corresponding to the listing of historical transcript sentences. The natural language processing computing entity 106 can map each respective historical transcript sentence to each respective historical summary sentence to generate a plurality of sentence-to-sentence pairs 850.

By way of example, the sentence-to-sentence pairs 850 for the example training sentence 815 can include a respective sentence-to-sentence pair for each summary sentence 845 of the historical summary 810. As illustrated for exemplary purposes, a subset of the sentence-to-sentence pairs 850 for the training sentence 815 can include a first pair including the training sentence 815 and the summary sentence 820, second pair including the training sentence 815 and the summary sentence 825, a third pair including the training sentence 815 and the summary sentence 830, etc.

The number of the plurality of sentence-to-sentence pairs 850 can include a product of the number of the plurality of historical narrative sentences and the number of the one or more historical summary sentences. By way of example, if the historical narrative data object 805 includes M historical narrative sentences and the historical summary 810 includes N historical summary sentences, the plurality of sentence-to-sentence pairs 850 can include M×N pairs.

Turning back to FIG. 7, at step/operation 703, the process 700 can include computing a relevance score for a training sentence of a historical narrative data object based at least in part on a historical summary corresponding to the historical narrative data object. For example, the natural language processing computing entity 106 can compute the relevance score for the training sentence of the historical narrative data object based at least in part on the historical summary corresponding to the historical narrative data object. The relevance score can be indicative of a relevance of the training sentence to each respective summary sentence of the historical summary. In some embodiments, the natural language processing computing entity 106 can compute a plurality of sentence-to-sentence relevance scores for the training sentence. The plurality of sentence-to-sentence relevance scores can include a respective sentence-to-sentence relevance score for each summary sentence in the historical summary. The relevance score can include the highest score of the plurality of sentence-to-sentence relevance scores.

At step/operation 704, the process 700 can include determining a training label for the training sentence based at least in part on the relevance score. For example, the natural language processing computing entity 106 can generate a training label for the training sentence based at least in part on the relevance score. The training label can indicate whether the training sentence is a relevant sentence or an irrelevant sentence of the historical narrative data object. The training label, for example, can include: (i) a relevant label identifying the training sentence as a relevant sentence to an impression of the historical narrative data object or (ii) an irrelevant label identifying the training sentence as an irrelevant sentence to the impression of the historical narrative data object.

At step/operation 705, the process 700 can include generating a labeled historical narrative data object based at least in part on the training label for the training sentence of the historical narrative data object. For example, the natural language processing computing entity 106 can generate the labeled historical narrative data object based at least in part on the training label for the training sentence of the historical narrative data object. The labeled historical narrative data object can include a plurality of labeled training sentences with corresponding labels identifying each training sentence as a relevant and/or irrelevant sentence of a historical narrative.

FIG. 9 provides an operational example of a second phase 900 for an automatic training data generation process in accordance with some embodiments discussed herein. As described herein, the automatic training data generation process builds the historical training dataset, having training sentences along with labels that indicate whether the training sentence is necessary or unnecessary, by utilizing a plurality of sentence-to-sentence pairs. The sentence-to-sentence pairs, for example, can include the training sentence 815 and the summary sentences 845 of FIG. 8.

During a scoring phase 905, the natural language processing computing entity 106 can compute a relevance score 910 for each sentence-to-sentence pair. For example, the relevance score 910 can include a rouge score between the example training sentence 815 and at least one of the one or more summary sentences 845. The rouge score (e.g., F1 score) for a respective sentence-to-sentence pair can be determined by considering the bigrams present in both the training sentence 815 and a respective summary sentence 845. A plurality of different rouge scores can be determined for the training sentence 815 based at least in part on the different bigrams present in the training sentence 815 and each respective summary sentence (e.g., example summary sentence 820, example summary sentence 825, example summary sentence 830, etc.).

The relevance scores 910 for the example training sentence 815 can include a first relevance score 920 based at least in part on a rouge score computed for bigrams present in the example training sentence 815 and the example summary sentence 820, a second relevance score 925 based at least in part on a rouge score computed for bigrams present in the example training sentence 815 and the example summary sentence 825, a third relevance score 930 based at least in part on a rouge score computed for bigrams present in the example training sentence 815 and the example summary sentence 830, etc.

The natural language processing computing entity 106 can determine a training label for the example training sentence 815 based the relevance scores 910 for the training sentence. For example, the natural language processing computing entity 106 can determine a relevant training label for the training sentence 815 responsive to a positive rouge score that exceeds a score threshold. In addition, or alternatively, the natural language processing computing entity 106 can determine an irrelevant training label for the training sentence responsive to a negative rouge score that does not achieve the score threshold. The score threshold can include a threshold rouge score of zero.

The natural language processing computing entity 106 can identify a maximum rouge score for each respective training sentence of the historical narrative data object. For each respective training sentence, the natural language processing computing entity 106 can generate an irrelevant label for the respective training sentence if the maximum rouge score is zero (e.g., such as second relevance score 925 and third relevance score 930). In addition, or alternatively, the natural language processing computing entity 106 can generate a relevant label for the respective training sentence if the maximum rouge score is above zero (e.g., such as first relevance score 920).

Turning back to FIG. 4, at step/operation 403, the process 400 can include, responsive to a determination that the at least one sentence is an irrelevant sentence, generating a pertinent summary by removing the at least one sentence from the narrative data object. For example, the natural language processing computing entity 106 can generate the pertinent summary by removing the at least one sentence from the narrative data object. The pertinent summary can include one or more summary sentences of the narrative data object that convey the at least one impression of the narrative data object. The one or more summary sentences, for example, can be descriptive of an intent and/or resolution of a narrative of the narrative data object.

As described herein, in some embodiments, the narrative data object can include a multi-party interaction transcript corresponding to a multi-party interaction between at least two participants. The pertinent summary can include one or more summary sentences of the multi-party interaction that are descriptive of the intent and/or resolution of the interaction or, in some embodiments, contextual information associated with the intent and/or resolution of the interaction.

FIG. 10 provides an operational example of an irrelevant sentence removal process 1000 in accordance with some embodiments discussed herein. As depicted, the irrelevant sentence removal process 1000 removes one or more irrelevant sentences 1010 from the narrative data object 1005, using the machine-learning based irrelevant classifier model 505, to generate the pertinent summary 1015.

Turning back to FIG. 4, at operation 404, the process 400 can include generating, based at least in part on the pertinent summary, an output indicia data object for the narrative data object. For example, the natural language processing computing entity 106 can generate the output indicia data object for the narrative data object. The output indica object can include (i) a prediction for the narrative data object; (ii) a characteristic for the narrative data object; and/or (iii) a modification of the narrative data object.

By way of example, the natural language processing computing entity 106 can generate a prediction for the narrative data object based at least in part on the pertinent summary. The prediction can include an intent prediction for the narrative data object. The intent prediction can be representative of a predicted intent and/or resolution of a narrative of the narrative data object. As described herein, the intent prediction can be utilized for computer natural language comprehension.

As another example, the natural language processing computing entity 106 can generate a characteristic for the narrative data object based at least in part on the pertinent summary. The characteristics can be indicative of a narrative classification, and/or any other narrative attribute such as, for example, participant attributes indicative of a participant's identity (e.g., member/agent identification and/or profile information, etc.), timing attributes (e.g., interaction length, time of interaction, etc.), geographical attributes (e.g., location of participant, etc.), issue attributes (e.g., category of issues relevant to the multi-party interaction, etc.), resolution attributes (e.g., category of issues resolution to the multi-party interaction, etc.), and/or any other attributes descriptive of a characteristic of the narrative. As described herein, the characteristics for the narrative data object such as, for example, the narrative classification can be utilized for automatic template generation, automatic narrative handling, and/or any other post narrative actions.

As yet another example, the natural language processing computing entity 106 can generate a modification of the narrative data object. The modification of the narrative data object can include another summary of the narrative data object. The summary, for example, can be automatically generated using one or more extractive and/or abstractive summarization techniques. Is some embodiments, for example, the pertinent summary can include one sub-step of a text processing pipeline for generating contextual summaries. After generation, the contextual summaries can be evaluated and used as training data to train the machine-learning based models described herein in a recursive training pipeline.

FIG. 11 is a flowchart diagram of an example process for initiating an action based at least in part on an output indicia data object in accordance with some embodiments discussed herein.

At operation 1101, the process 1100 can include generating an intent prediction. For example, the output indicia data object can include an intent prediction for the narrative data object. The natural language processing computing entity 106 can generate, using the machine-learning based intent prediction model, the intent prediction based at least in part on the pertinent summary.

The machine-learning based intent prediction model can include any type of machine-learning based model including one or more supervised, unsupervised, and/or reinforcement learning based models. In some implementations, the machine-learning based intent prediction model can include an intent classification model previously trained to classify a participant's intent based at least in part on a textual narrative. The intent classification model can include one or more different machine-learning based models and/or natural language processing techniques.

The machine-learning based intent prediction model can generate an intent prediction based at least in part on the one or more sentences of a narrative transcript. The performance of conventional intent classification models can be impacted by irrelevant sentences. For example, an irrelevant sentence can lead to erroneous intent predictions by include terminology and/or phrase that can mislead the machine-learning based intent prediction model. Therefore, the present disclosure presents a technical improvement to machine-learning based models and natural language processing techniques in general, by removing irrelevant sentences before generating the intent prediction. Advantageously, this can lead to improved processing times, lower processing power expenditures, and increased accuracy for intent predictions.

At operation 1102, the process 1100 can include generating a classification prediction. For example, the output indicia data object can include a classification prediction for the narrative data object. The natural language processing computing entity 106 can generate, using a machine-learning based prediction model, the classification prediction based at least in part on the pertinent summary.

The machine-learning based prediction model can include any type of machine-learning based model including one or more supervised, unsupervised, and/or reinforcement learning based models. In some implementations, the machine-learning based prediction model can include a call categorization model previously trained to classify a customer service call into one or more call categories.

At operation 1103, the process 1100 can include generating a paraphrased summary. For example, the output indicia data object can include a paraphrased contextual summary for the narrative data object. The natural language processing computing entity 106 can generate, using a machine-learning based paraphraser model, the paraphrased contextual summary based at least in part on the pertinent summary.

The machine-learning based paraphraser model can include any type of machine-learned model including one or more supervised, unsupervised, and/or reinforcement learning models. In some implementations, the machine-learned paraphraser model can include a machine-learned abstractive text summarization model. For instance, the machine-learned abstractive text summarization model can include one or more neural networks (e.g., feedforward artificial neural networks, perceptron and multilayer perceptron neural networks, radial basis function artificial neural networks, recurrent neural networks, modular neural networks, etc.), transformer models, and/or any other abstractive natural language processing model. In some embodiments, the machine-learned abstractive text summarization model can include a sequence-to-sequence model.

In some embodiments, the machine-learning based irrelevant classifier model can be used with the machine-learning based paraphraser model to remove irrelevant sentences and phrases from a narrative to generate contextual summary of the narrative. By removing entire sentences from a narrative data object, the machine-learning based irrelevant classifier model can provide an improvement to abstractive text summarization techniques such as, for example, sequence-to-sequence models that may only remove portions of an irrelevant sentence.

At operation 1104, the process 1100 can include, responsive to an intent prediction, generating a query resolution based at least in part on the intent prediction. For example, the natural language processing computing entity 106 can generate a query resolution based at least in part on the intent prediction. In some embodiments, the natural language processing computing entity 106 can be an automated robotic assistant. The intent prediction can be indicative of an intention of an assistance query provided to the automated robotic assistant. The automated robotic assistant can be configured to generate the query resolution for the assistance query based at least in part on the intent prediction.

At operation 1105, the process 1100 can include initiating a narrative action. A different narrative action can be initiated responsive to the query resolution, the classification prediction, and/or the paraphrased summary. As one example, the natural language processing computing entity 106 can initiate the narrative action based at least in part on the query resolution. The narrative action, for example, can include providing information in response the query resolution, contacting a third-party, etc.

As another example, the natural language processing computing entity 106 can initiate the narrative action based at least in part on the classification prediction. For instance, the narrative action can include storing the pertinent narrative based at least in part on the classification prediction, generating a summary template based at least in part on the classification prediction, etc. As yet another example, the natural language processing computing entity 106 can initiate the narrative action based at least in part on the paraphrased summary. The narrative action, for example, can include a performance assessment for a particular participant of the narrative based at least in part on the paraphrased summary.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors, a narrative data object comprising one or more sentences;

inputting, by the one or more processors, a sentence, without contextual data from the narrative data object, of the one or more sentences to a binary classification model to determine a binary classification that identifies a general relevance of the sentence, wherein the binary classification comprises either a relevant classification or an irrelevant classification and the binary classification model is trained by:

(i) receiving (a) a training input comprising a historical narrative data object with a plurality of historical narrative sentences and (b) a training output comprising one or more summary sentences for the historical narrative data object, (ii) determining a first labeled historical narrative sentence from the training input by assigning a relevant training label to a first historical narrative sentence of the plurality of historical narrative sentences in response to a first determination that a first maximum relevance score of a first plurality of relevance scores between the first historical narrative sentence and the one or more summary sentences exceeds a score threshold of zero, (iii) determining a second labeled historical narrative sentence from the training input by assigning an irrelevant training label to a second historical narrative sentence of the plurality of historical narrative sentences in response to a second determination that a second maximum relevance score of a second plurality of relevance scores between the second historical narrative sentence and the one or more summary sentences fails to exceed the score threshold of zero, and (iv) training the binary classification model using the first labeled historical narrative sentence and the second labeled historical narrative sentence from the training input;

responsive to a determination that the binary classification is the irrelevant classification, generating, by the one or more processors, a pertinent summary by removing the sentence from the narrative data object; and outputting, by the one or more processors and based at least in part on the pertinent summary, an output indicia data object for the narrative data object.

2. The computer-implemented method of claim 1, wherein the output indicia data object comprises an intent prediction for the narrative data object, and wherein outputting, based at least in part on the pertinent summary, the output indicia data object for the narrative data object comprises:

generating, using a machine-learning based intent prediction model, the intent prediction based at least in part on the pertinent summary.

3. The computer-implemented method of claim 1, wherein the output indicia data object comprises a classification prediction for the narrative data object, and wherein outputting, based at least in part on the pertinent summary, the output indicia data object for the narrative data object comprises:

generating, using a machine-learning based prediction model, the classification prediction based at least in part on the pertinent summary.

4. The computer-implemented method of claim 1, wherein the output indicia data object comprises a paraphrased contextual summary for the narrative data object, and wherein outputting, based at least in part on the pertinent summary, the output indicia data object for the narrative data object comprises:

generating, using a machine-learning based paraphraser model, the paraphrased contextual summary based at least in part on the pertinent summary.

5. The computer-implemented method of claim 1, wherein the binary classification model is trained using supervisory training techniques.

6. The computer-implemented method of claim 1, wherein the first maximum relevance score comprises a first Recall-Oriented Understudy for Gisting Evaluation (ROUGE) score and the second maximum relevance score comprises a second ROUGE score.

7. The computer-implemented method of claim 6, wherein the relevant training label is determined responsive to the first ROUGE score exceeding the score threshold, and the irrelevant training label is determined responsive to the second ROUGE score failing to exceed the score threshold.

8. The computer-implemented method of claim 1, wherein the narrative data object comprises a multi-party interaction transcript corresponding to a multi-party interaction between at least two participants and the pertinent summary comprises a summary sentence of the multi-party interaction.

9. A system comprising:

one or more processors; and one or more memories storing processor-executable instructions that, when executed by the one or more processors, cause the one or more processors to perform operations comprising:

receiving a narrative data object comprising one or more sentences;

inputting a sentence, without contextual data from the narrative data object, of the one or more sentences to a binary classification model to determine a binary classification that identifies a general relevance of the sentence, wherein the binary classification comprises either a relevant classification or an irrelevant classification and the binary classification model is trained by:

(i) receiving (a) a training input comprising a historical narrative data object with a plurality of historical narrative sentences and (b) a training output comprising one or more summary sentences for the historical narrative data object, (ii) determining a first labeled historical narrative sentence from the training input by assigning a relevant training label to a first historical narrative sentence of the plurality of historical narrative sentences in response to a first determination that a first maximum relevance score of a first plurality of relevance scores between the first historical narrative sentence and the one or more summary sentences exceeds a score threshold of zero, (iii) determining a second labeled historical narrative sentence from the training input by assigning an irrelevant training label to a second historical narrative sentence of the plurality of historical narrative sentences in response to a second determination that a second maximum relevance score of a second plurality of relevance scores between the second historical narrative sentence and the one or more summary sentences fails to exceed the score threshold of zero, and (iv) training the binary classification model using the first labeled historical narrative sentence and the second labeled historical narrative sentence from the training input;

responsive to a determination that the binary classification is the irrelevant classification, generating a pertinent summary by removing the sentence from the narrative data object; and outputting, based at least in part on the pertinent summary, an output indicia data object for the narrative data object.

10. The system of claim 9, wherein the output indicia data object comprises an intent prediction for the narrative data object, and outputting, based at least in part on the pertinent summary, the output indicia data object for the narrative data object comprises:

generating, using a machine-learning based intent prediction model, the intent prediction for the narrative data object.

11. The system of claim 10, wherein the system comprises an automated robotic assistant.

12. The system of claim 11, wherein the narrative data object is an assistance query, and the operations further comprise:

generating a query resolution for the assistance query based at least in part on the intent prediction, and initiating an action based at least in part on the query resolution.

13. One or more non-transitory computer-readable media storing processor-executable instructions that, when executed by one or more processors, cause the one or more processors to perform operations comprising:

receiving a narrative data object comprising one or more sentences;

inputting a sentence, without contextual data from the narrative data object, of the one or more sentences to a binary classification model to determine a binary classification that identifies a general relevance of the sentence, wherein the binary classification comprises either a relevant classification or an irrelevant classification and the binary classification model is trained by:

(i) receiving (a) a training input comprising a historical narrative data object with a plurality of historical narrative sentences and (b) a training output comprising one or more summary sentences for the historical narrative data object, (ii) determining a first labeled historical narrative sentence from the training input by assigning a relevant training label to a first historical narrative sentence of the plurality of historical narrative sentences in response to a first determination that a first maximum relevance score of a first plurality of relevance scores between the first historical narrative sentence and the one or more summary sentences exceeds a score threshold of zero, (iii) determining a second labeled historical narrative sentence from the training input by assigning an irrelevant training label to a second historical narrative sentence of the plurality of historical narrative sentences in response to a second determination that a second maximum relevance score of a second plurality of relevance scores between the second historical narrative sentence and the one or more summary sentences fails to exceed the score threshold of zero, and (iv) training the binary classification model using the first labeled historical narrative sentence and the second labeled historical narrative sentence from the training input;

responsive to a determination that the binary classification is the irrelevant classification, generating a pertinent summary by removing the sentence from the narrative data object; and outputting, based at least in part on the pertinent summary, an output indicia data object for the narrative data object.

* * * * *